United States Patent [19]
Sawayama et al.

[11] Patent Number: 5,640,259
[45] Date of Patent: Jun. 17, 1997

[54] LIQUID CRYSTAL DEVICE WITH THE RETARDATION OF THE LIQUID CRYSTAL LAYER GREATER THAN λ/2 AND A METHOD FOR DRIVING THE SAME

[75] Inventors: Yutaka Sawayama, Tenri; Naofumi Kimura, Nabari; Yoshitaka Yamamoto, Yamatokoriyama; Yutaka Ishii, Nara, all of Japan

[73] Assignee: Sharp Kabushiki Kaisha, Osaka, Japan

[21] Appl. No.: 358,953

[22] Filed: Dec. 19, 1994

[30] Foreign Application Priority Data

Dec. 20, 1993 [JP] Japan .................... 5-320335

[51] Int. Cl.$^6$ .............. G02F 1/133; G02F 1/13
[52] U.S. Cl. ........................ 349/33; 349/177
[58] Field of Search ..................... 359/55, 93

[56] References Cited

U.S. PATENT DOCUMENTS

| | | | |
|---|---|---|---|
| 4,378,955 | 4/1983 | Bleha, Jr. et al. | 359/93 |
| 4,385,806 | 5/1983 | Fergason | 350/332 |
| 4,595,259 | 6/1986 | Perregaux | 350/341 |
| 5,117,224 | 5/1992 | Kawamura et al. | 359/55 |
| 5,225,823 | 7/1993 | Kanaly | 340/793 |
| 5,245,455 | 9/1993 | Sayyah et al. | 359/93 |
| 5,251,049 | 10/1993 | Sato et al. | 359/93 |
| 5,347,382 | 9/1994 | Rumbaugh | 359/84 |

FOREIGN PATENT DOCUMENTS

| | | |
|---|---|---|
| 56-51352 | 12/1981 | Japan . |
| 8701468 | 3/1987 | WIPO . |

OTHER PUBLICATIONS

"Nematic Liquid Crystal Modulator with Response Time Less Than 100 μs at Room Temperature", S. Wu, Appl. Phys. Lett. vol. 57 No. 10, Sep. 3, 1900, pp. 986–988.

"High Speed Nematic Liquid Crystal Modulators", Wu et al., 3rd International Topical Meeting on Optics of LCs, Oct. 1–5, 1990, Italy.

"Submicrosecond Bistable Electro–Optic Switching in Liquid Crystals", Clark et al., Appl. Phys. Lett. vol. 36 No. 11, Jun. 1, 1980, pp. 899–901.

Mol. Cryst. Liq. Cryst., vol. 123, pp. 15–55 (1985).

Molecular Crystals and Liquid Crystals, vol. 109, No. 1, p. 32 (1984).

SID International Symposium, Digest of Technical Papers, vol. XVIII, pp. 75–78 (1987).

Conference Record of 1980 Biennial Display Research Conference, pp. 177–179 (1980).

Primary Examiner—William L. Sikes
Assistant Examiner—Charles Miller

[57] ABSTRACT

A liquid crystal device includes a pair of substrates, a liquid crystal layer interposed between the pair of substrates, at least one polarizing element, and a plurality of pixels. A retardation (d×Δn) of the liquid crystal layer satisfies the relation:

$$d \times \Delta n > \lambda/2$$

when incident light is output after passing through the liquid crystal layer once. The retardation satisfies the relation:

$$2d \times \Delta n > \lambda/2$$

when the incident light is output after passing through the liquid crystal layer twice. In these relations, d a thickness of the liquid crystal layer, Δn is a birefringence, and λ is a wavelength of the light incident on the liquid crystal layer. A driving voltage supplier applies a driving voltage including a voltage higher than a maximum voltage providing an extremum of the output light intensity in a voltage-output light intensity characteristic of the pixels to the plurality of pixels. Such application of the driving voltage allows utilization of a relaxation process of liquid crystal molecules in the liquid crystal layer to obtain a predetermined light output density.

50 Claims, 27 Drawing Sheets

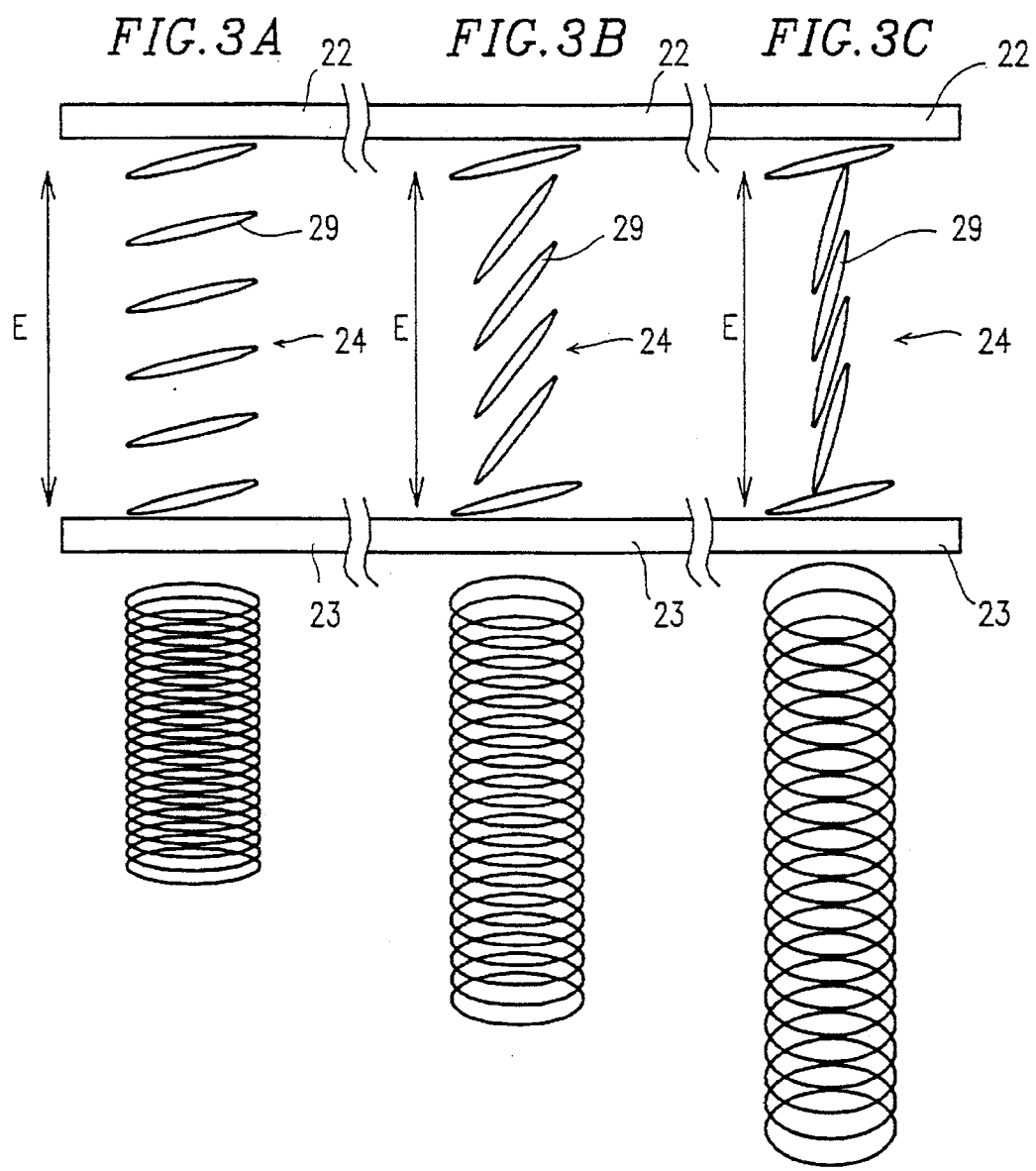

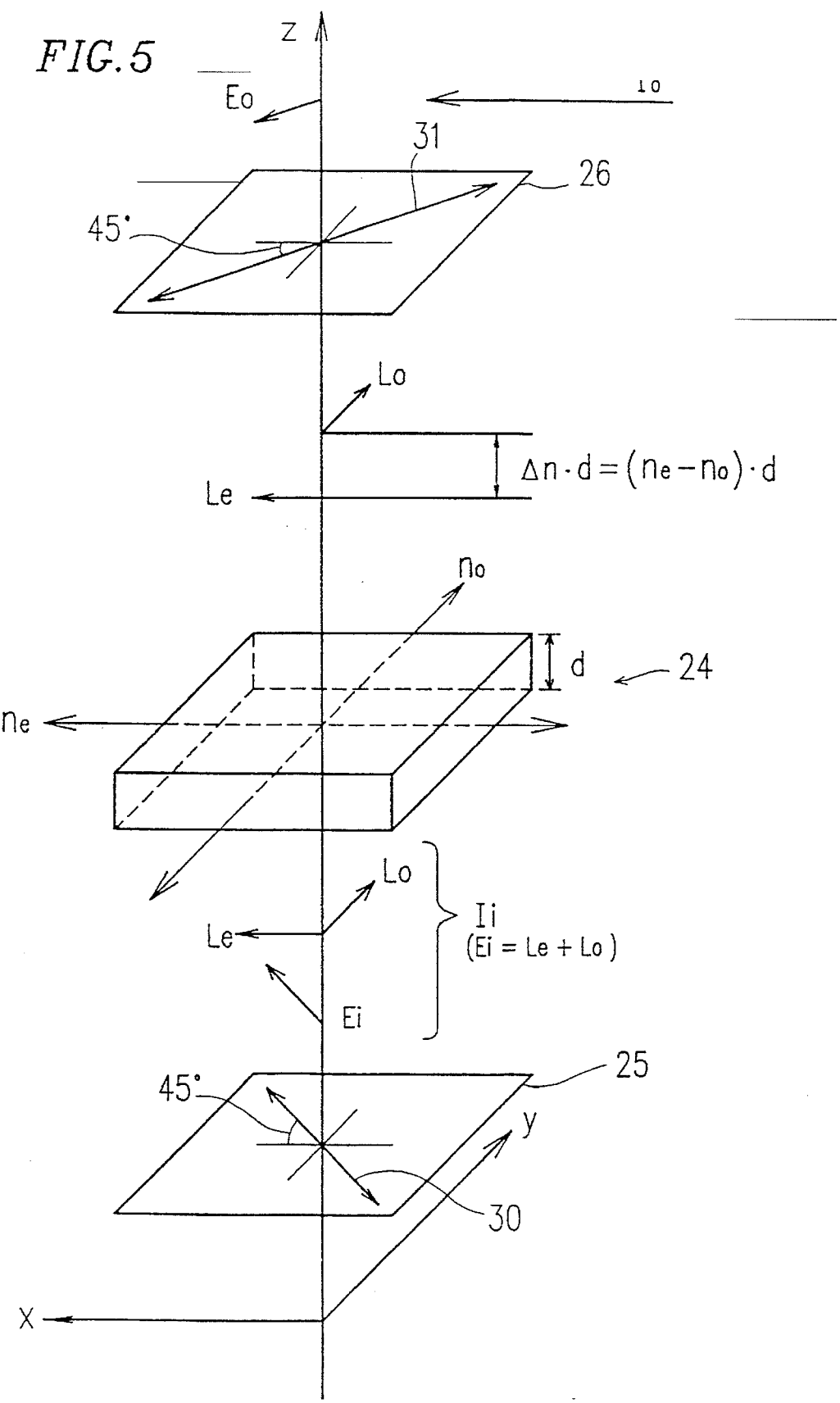

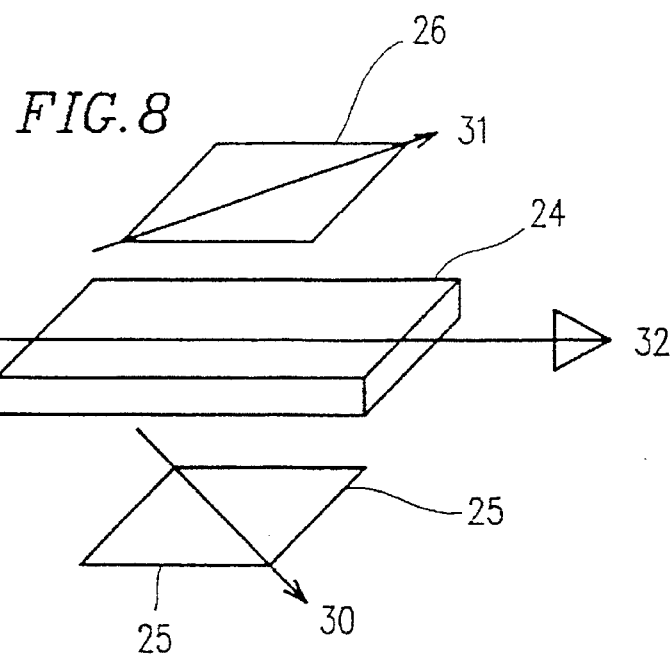
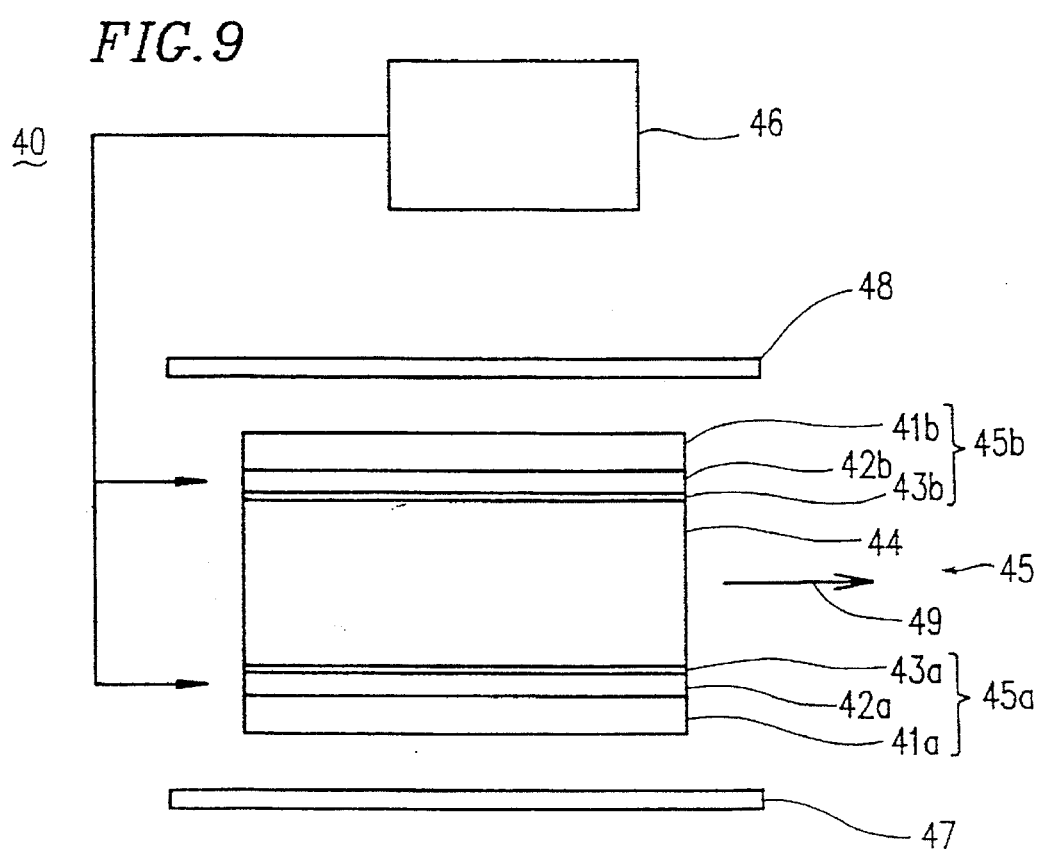

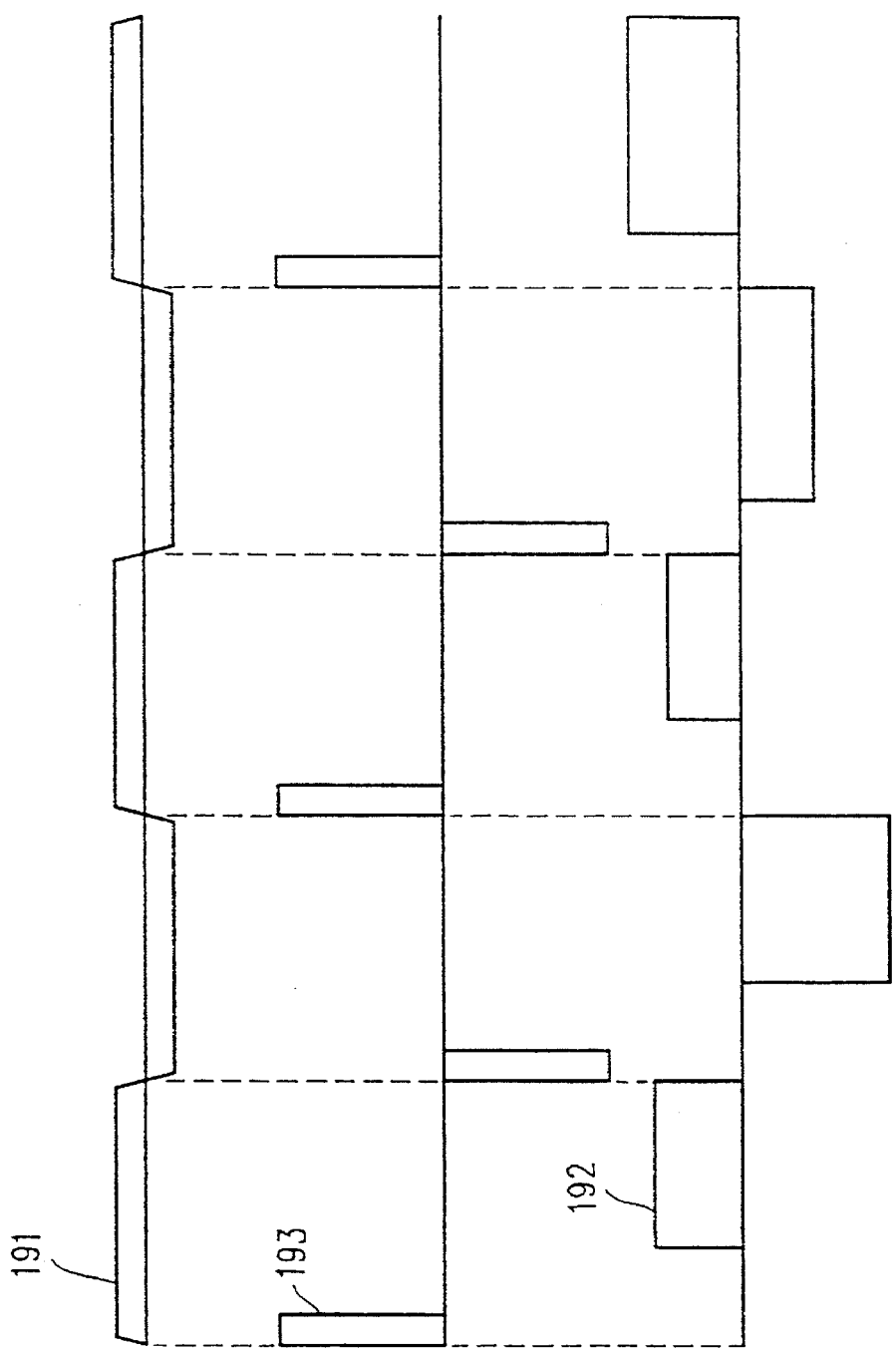

Rise time 39.1 [msec]
Decay time 35.1 [msec]

LIQUID CRYSTAL DEVICE WITH THE RETARDATION OF THE LIQUID CRYSTAL LAYER GREATER THAN λ/2 AND A METHOD FOR DRIVING THE SAME

BACKGROUND OF THE INVENTION

1. Field of the Invention

The present invention relates to a liquid crystal device and a method for driving the same, more particularly to a liquid crystal device having a high response speed and a method for driving the same.

2. Description of the Related Art

A conventional projection-type liquid crystal display device using a liquid crystal device is capable of obtaining a picture of a large size with relative ease by irradiating light onto a liquid crystal display so as to project the light onto a screen. There are two methods for obtaining a color display: a method in which a projected light beam is split into red, green and blue light beams, and a liquid crystal display device is used for each of the colors (simultaneous additive color mixing); and a method in which red, green and blue pixels are provided in a liquid crystal display device as in a direct-view type (juxtapositonal additive color mixing). However, both methods have problems. With the former method, while high resolution can be obtained with ease, it is expensive to realize such a liquid crystal display device. As shown in FIG. 29, light beams radiated from a lamp 1 as a light source propagate through three optical paths, that is, a dichroic mirror for a red light beam 2, a dichroic mirror for a green light beam 3, and a dichroic mirror for a blue light beam 4. The light beams pass through liquid crystal panels 5, 6 and 7, respectively, and are output from a lens 8. As described above, since the three liquid crystal display panels 5, 6 and 7 are used, the optical system for projection becomes complex and large in size as a whole system. Moveover, if a defective pixel exists even in one liquid crystal display panel among the three, a bright spot with a single color or a mixed color occurs in the projected image at a portion corresponding to the defective pixel. On the other hand, while the latter method is inexpensive, it has a problem in that the quality of displayed image is deteriorated unless the size of red, green and blue pixels in a projected image is smaller than the spatial resolution of human eyes. As one of the methods for solving the above problem, a field sequential color mixing method, a color mixing method by using a field sequential addressing method, is known which can display red, green and blue with one pixel. The characteristics of high precision and high brightness of the field sequential color mixing method have the following features.

(1) The principle of displaying color images by the field sequential color mixing method is the same as that by the simultaneous additive color mixing method. Therefore, the field sequential color mixing method provides high precision images.

(2) In the case where the liquid crystal panel has a defective pixel, the defective pixel is displayed as a white or black point. The white or black point is less conspicuous than the colored bright point. Accordingly, even if the defective pixel exists in the liquid crystal panel, the quality of the displayed image is not deteriorated.

(3) Full-color display or multi-color display can be realized with a single liquid crystal panel, and therefore the optical system can be miniaturized and lightened. Since it is not necessary to use a plurality of light shutters as in the simultaneous additive color mixing method, it is possible to miniaturize the system and lower the fabrication cost.

As described above, a compact and light color liquid crystal display device with high brightness and high precision, which is excellent in display quality, can be obtained with the use of the field sequential addressing method.

In the case of the field sequential addressing method, however, the time allowed for displaying images corresponding to each of Red, Green and Blue in one field is in the range of 5 to 6 msec. At the present time, the response time of Twisted Nematic (TN) mode used in an active matrix liquid crystal display device is approximately several tens msec. In the case of FIG. 30, the response times for rise and decay are 39.1 msec and 35.1 msec, respectively. Considering that the response time in a liquid crystal display mode, which utilizes optical switching between on/off states in the vicinity of a threshold voltage, is the same as or longer than that for the TN mode, it is practically impossible to realize the color liquid crystal display device of the field sequential addressing method.

As a conventional liquid crystal display mode having high-speed response, Surface Stabilized Ferroelectric Liquid Crystal (SSF-LC) mode is well-known (N. A. Clark and S. T. Lagerwall; Appl. Phys. Lett., 36,899: 1980). The feature of SSF-LC mode is as follows: the ferroelectric liquid crystal molecules have spontaneous polarization, and the display is performed by utilizing the property of the liquid crystal molecules which change their orientations so that the polarity of the spontaneous polarization and the polarity of an applied electric field are parallel with each other.

Regarding a liquid crystal display method with high-speed response other than the ferroelectric liquid crystal mode, Japanese Patent Publication No. 56-51352 describes that the response speed is increased by applying a voltage close to the threshold value and a voltage close to the saturation voltage at which an optical characteristic of the liquid crystal is saturated.

Another high-speed response display mode using nematic liquid crystal is described in a publication (Nematic liquid crystal modulator with response time less than 100 μs at room temperature: Shin-Tson Wu; Appl. Phys. Lett. 57(10), 986 1990). The method for driving the liquid crystal display described in the publication is shown in FIG. 31. A voltage ($V_{off}$) is continuously applied to the liquid crystal molecules such that the orientational deformation of the liquid crystal molecules from the initial orientation state becomes the largest. In this state, the transmittance of the liquid crystal display is zero. Then, zero voltage ($V_0$) is applied to the liquid crystal molecules such that the orientational deformation of the liquid crystal molecules is relaxed. The transmittance is changed by varying a time period for applying zero voltage, thereby obtaining a gray-scale display. The relaxation process of the liquid crystal molecules which are orientationally deformed is often compared to the movement of a spring. The potential energy due to the interaction of the liquid crystal molecules becomes higher as the degree of the orientational deformation of the liquid crystal molecules becomes larger. As a result, the liquid crystal molecules in the highly deformed orientation state relax with extremely high speed.

However, the conventional liquid crystal display mode using the ferroelectric liquid crystals (FLC mode), such as SSF-LC mode, suffers from the following problems. In addition to the difficulty in controlling the orientation of the ferroelectric liquid crystal molecules, the orientation of the molecules is easily destroyed by a mechanical shock. Moreover, since the orientation of the ferroelectric liquid crystals is in a bistable state, it is difficult to obtain the gray-scale display.

As for the driving method described in Japanese Patent Publication No. 56-51352, it is not capable of displaying gray-scale. Moreover, since the degree of the change in the orientation state of the liquid crystal molecules is large, it is difficult to increase the response speed higher than that for the TN mode.

The method in which the relaxation of the orientational deformation of liquid crystal molecules is adjusted by varying the voltage unapplied period in order to obtain the gray-scale display, such as the above-mentioned high-speed response display mode using the nematic liquid crystal, cannot be adopted to matrix driving used for commercial liquid crystal display devices and the like.

SUMMARY OF THE INVENTION

The liquid crystal device of this invention, includes:
a pair of substrates;
a liquid crystal layer interposed between the pair of substrates;
at least one polarizing element;
a plurality of pixels;
a retardation ($d \times \Delta n$) of the liquid crystal layer satisfying one of a relation:

$$d \times \Delta n > \lambda/2$$

in a case where an incident light is output after passing through the liquid crystal layer once, and a relation:

$$2d \times \Delta n > \lambda/2$$

in a case where the incident light is output after passing through the liquid crystal layer twice, where d is a thickness of the liquid crystal layer, $\Delta$ is d, a birefringence and $\lambda$ is a wavelength of the light incident on the liquid crystal layer; and
a driving voltage applying device for applying a driving voltage including a voltage higher than a maximum voltage providing an extremum of the output light intensity in a voltage-output light intensity characteristic of the pixels to the plurality of pixels.

In one embodiment of the present invention, the driving voltage applying device applies the driving voltage to the pixels by a field sequential addressing method.

In one embodiment of the present invention, the liquid crystal device includes a retardation compensation unit between the liquid crystal layer and the polarizing element.

In another embodiment of the present invention, the driving voltage applying device applies a voltage higher than the maximum voltage providing the extremum of the output light intensity in the voltage-output light intensity characteristic and a voltage between the voltage higher than the maximum voltage and the maximum voltage, thereby controlling the output light intensity of the pixels.

In still another embodiment of the present invention, the driving voltage applying device reverses a polarity of the driving voltage in each frame.

In still another embodiment of the present invention, the driving voltage applying device applies a first preliminary voltage having an absolute value larger than that of a signal voltage corresponding to a predetermined output light intensity before applying the signal voltage to the pixels.

In still another embodiment of the present invention, the driving voltage applying means further applies a second preliminary voltage having an absolute value smaller than that of the signal voltage before applying the signal voltage corresponding to the predetermined output light intensity and after applying the first preliminary voltage.

In still another embodiment of the present invention, the absolute value of the first preliminary voltage is larger than that of the maximum voltage providing an extremum in the voltage-output light intensity characteristic of the pixels.

In still another embodiment of the present invention, the output light intensity at a maximum value of the signal voltage is equal to or less than 10% of a maximum in the voltage-output light intensity characteristic of the pixels.

In still another embodiment of the present invention, the absolute value of the second preliminary voltage is smaller than that of the maximum voltage providing the extremum in the voltage-output light intensity characteristic of the pixels.

In still another embodiment of the present invention, a time period for applying the first preliminary voltage is one-fifth or less than that for applying the signal voltage.

In still another embodiment of the present invention, a sum of the time period for applying the first preliminary voltage and the time period for applying the second preliminary voltage is one-fifth or less than a time period for applying the signal voltage.

In still another embodiment of the present invention, the driving voltage applying device applies the first preliminary voltage to the pixels connected to each scanning line at the same time.

In still another embodiment of the present invention, the driving voltage applying device applies the first preliminary voltage to the pixels connected to at least one scanning line.

In still another embodiment of the present invention, the driving voltage applying device applies the first preliminary voltage and the second preliminary voltage to the pixels connected to at least one scanning line for display.

In still another embodiment of the present invention, a value of the first preliminary voltage is identical to all the pixels.

In still another embodiment of the present invention, at least one of the first preliminary voltage and the second preliminary voltage has an identical value for all the pixels.

In still another embodiment of the present invention, the retardation compensation unit has at least a pair of substrates and a second liquid crystal layer interposed therebetween, and an electro-optical characteristic of the second liquid crystal layer is substantially identical with that of the liquid crystal layer.

In still another embodiment of the present invention, the retardation compensation unit is selected from a phase plate and a phase film.

In still another embodiment of the present invention, the retardation compensation unit is selected from a uniaxially oriented polymer film and a biaxially oriented film.

In still another embodiment of the present invention, one of the pair of substrates is a silicon single crystalline substrate, and the silicon single crystalline substrate has a transistor switching a voltage applied from the driving voltage applying means to each of the plurality of pixels.

According to another aspect of the present invention, a projection-type liquid crystal display device including a liquid crystal element, wherein the liquid crystal element includes:
a pair of substrates;
a liquid crystal layer interposed between the pair of substrates;

at least one polarizing element;
a plurality of pixels;
a retardation (d×Δn) of the liquid crystal layer satisfying one of a relation:

$$d \times \Delta n > \lambda/2$$

in a case where an incident light is output after passing through the liquid crystal layer once, and a relation:

$$2d \times \Delta n > \lambda/2$$

in a case where the incident light is output after passing through the liquid crystal layer twice, where d is a thickness of the liquid crystal layer, Δn is a birefringence and λ is a wavelength of the light incident on the liquid crystal layer; and driving voltage applying device for applying a driving voltage including a voltage higher than a maximum voltage providing an extremum of the output light intensity in a voltage-output light intensity characteristic of the pixels to the plurality of pixels, is provided.

According to another aspect of the present invention, a method for driving a liquid crystal device including: a pair of substrates; a liquid crystal layer interposed between the pair of substrates; at least one polarizing element; a plurality of pixels; and a retardation (d×Δn) of the liquid crystal layer satisfying one of a relation:

$$d \times \Delta n > \lambda/2$$

in a case where an incident light is output after passing through the liquid crystal layer once, and a relation:

$$2d \times \Delta n > \lambda/2$$

in a case where the incident light is output after passing through the liquid crystal layer twice, where d is a thickness of the liquid crystal layer, Δn is a birefringence, and λ is a wavelength of the light incident on the liquid crystal layer, is provided. The method includes a step of applying a driving voltage including a voltage higher than a maximum voltage providing an extremum of the output light intensity in a voltage-output light intensity characteristic of the pixels to the plurality of pixels.

In one embodiment of the present invention, the driving voltage applying step includes applying the driving voltage to the pixels by a field sequential addressing method.

In another embodiment of the present invention, the driving voltage applying step includes applying a voltage higher than the maximum voltage providing the extremum of the output light intensity in the voltage-output light intensity characteristic and a voltage between the voltage higher than the maximum voltage and the maximum voltage, thereby controlling the output light intensity of the pixels.

In still another embodiment of the present invention, a polarity of the driving voltage is reversed in each frame.

In still another embodiment of the present invention, the driving voltage applying step includes applying a first preliminary voltage having an absolute value larger than that of a signal voltage corresponding to a predetermined output light intensity before applying the signal voltage to the pixels.

In still another embodiment of the present invention, the driving voltage applying step further includes applying a second preliminary voltage having an absolute value smaller than that of the signal voltage before applying the signal voltage corresponding to the predetermined output light intensity and after applying the first preliminary voltage.

In still another embodiment of the present invention, the absolute value of the first preliminary voltage is larger than that of the maximum voltage providing an extremum in the voltage-output light intensity characteristic of the pixels.

In still another embodiment of the present invention, the absolute value of the second preliminary voltage is smaller than that of the maximum voltage providing the extremum in the voltage-output light intensity characteristic of the pixels.

In still another embodiment of the present invention, a time period for applying the first preliminary voltage is one-fifth or less than that for applying the signal voltage.

In still another embodiment of the present invention, a sum of the time period for applying the first preliminary voltage and the time period for applying the second preliminary voltage is one-fifth or less than a time period for applying the signal voltage.

In still another embodiment of the present invention, the driving voltage applying step includes applying the first preliminary voltage to the pixels connected to each scanning line at the same time.

In still another embodiment of the present invention, the driving voltage applying step includes applying the first preliminary voltage to the pixels connected to at least one scanning line.

In still another embodiment of the present invention, the driving voltage applying step includes applying the first preliminary voltage and the second preliminary voltage to the pixels connected to at least one scanning line for display.

In still another embodiment of the present invention, a value of the first preliminary voltage is identical to all the pixels.

In still another embodiment of the present invention, at least one of the first preliminary voltage and the second preliminary voltage has an identical value for all the pixels.

Thus, the invention described herein makes possible the advantages of (1) providing a liquid crystal device having sufficient high-speed response, and (2) providing a method for driving the same.

These and other advantages of the present invention will become apparent to those skilled in the art upon reading and understanding the following detailed description with reference to the accompanying figures.

BRIEF DESCRIPTION OF THE DRAWINGS

FIGS. 3A to 3C are diagrams showing behaviors of liquid crystal molecules of homogeneous ECB mode due to an applied voltage.

FIG. 5 is a diagram showing a configuration of a liquid crystal cell of homogenous ECB mode in the liquid crystal device of FIG. 1.

FIG. 8 is a diagram showing a configuration of a liquid crystal cell of homogenous ECB mode in the liquid crystal device of FIG. 1.

FIG. 9 is a diagram showing a liquid crystal display device according to a second example of the present invention.

FIGS. 21A to 21C are time charts of a driving voltage waveform used for the AM-LCD of FIG. 20.

DESCRIPTION OF THE PREFERRED EMBODIMENTS

Hereinafter, the present invention will be described by way of examples with reference to the accompanying drawings.

EXAMPLE 1

Figure 1:
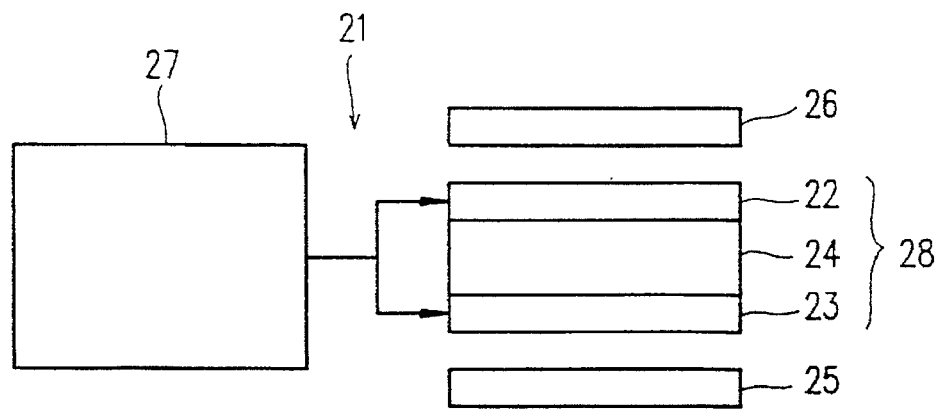
FIG. 1 is a diagram showing a configuration of a liquid crystal device according to a first example of the present invention.

FIG. 1 shows a configuration of a transmissive liquid crystal device according to a first example of the present invention. In FIG. 1, a liquid crystal device 21 includes a pair of substrates 22 and 23, a liquid crystal layer 24 interposed between the pair of substrates 22 and 23, a polarizer 25, an analyzer 26, and a driving voltage supplying portion 27 for supplying a driving voltage to electrodes (not shown) formed on the pair of substrates 22 and 23. A liquid crystal cell 28 is constituted by the pair of substrates 22 and 23 and the liquid crystal layer 24. The liquid crystal cell 28 has a plurality of pixels (not shown). The pixel is the smallest portion of the liquid crystal cell 28 which can control the transmittance of light independently. The driving voltage supplying portion 27 drives the liquid crystal cell 28 by supplying voltages to the pixels in accordance with the field sequential addressing method.

Figure 2:
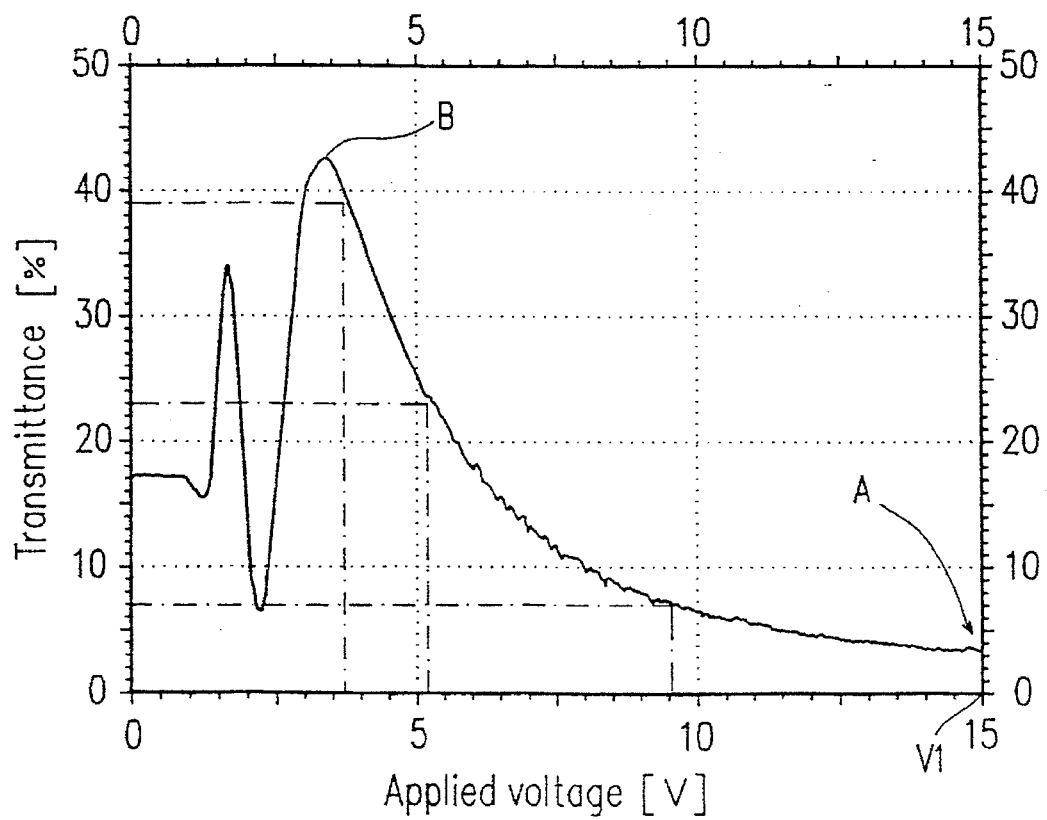
FIG. 2 is a graph showing a voltage-transmittance characteristic of homogeneous ECB mode in the case where d×Δn>λ/2, in the liquid crystal device of FIG. 1.

Each of the pixels of the liquid crystal cell 28 exhibits the voltage-transmittance (V-T) characteristic shown in FIG. 2. The driving voltage supplying portion 27 supplies the voltages having values corresponding to point A from point B in FIG. 2, so that optical on/off switching is obtained between the maximum value (B) and the minimum value (A) of the transmittance in the V-T characteristic of FIG. 2.

The V-T characteristic shown in FIG. 2 is obtained when the retardation (d×Δn), which is an optical path difference between an ordinary ray and an extraordinary ray for the liquid crystal layer 24, satisfies the relation:

$$d \times \Delta n > \lambda/2$$

where d is the thickness of the liquid crystal layer 24, Δ is a difference between the refractive indices of the ordinary ray and the extraordinary ray (birefringence), and λ is a wavelength of the incident light for display. More specifically, the V-T characteristic in FIG. 2 is obtained in the case of d×Δn>3λ/2.

In the present specification, the point A on the uppermost voltage $V_1$ in FIG. 2 is referred to as a mode 0, at which the transmittance has the lowest value in the V-T characteristic. At the mode 0 in the V-T characteristic, the transmittance of the liquid crystal cell 28 is substantially saturated. The voltage $V_1$ at which the transmittance of the liquid crystal cell is saturated will be referred to as a saturation voltage. The point B in the V-T characteristic is referred to as a first extremum, which is in a brightest state (a maximum point) obtained for the first time when the voltage is gradually lowered from the saturation voltage $V_1$ at which the optical characteristic becomes mode 0. The transmittance gradually decreases from the point B as the applied voltage increases. Therefore, the point A is determined by the value of the saturation voltage $V_1$. Practically, the value of the saturation voltage $V_1$ may be selected from a voltage higher than a maximum voltage providing an extremum of the transmittance of the liquid crystal cell taking a contrast ratio and a response speed into consideration. For example, in order to obtain a contrast ratio equal to or more than 10 for a display device having the V-T characteristic shown in FIG. 2, a signal voltage for display having a maximum voltage providing the output light intensity equal to or less than 10% of the maximum (point B) in the V-T characteristic is applied. In this case, the value of the saturation voltage $V_1$ is set higher than the maximum voltage of the signal voltage.

In this example, as will be described later, the polarizer and the analyzer are set in a crossed Nicol state, therefore the transmittance (point A) at the saturation voltage $V_1$ has the lowest value. On the other hand, in the case where the polarizer and the analyzer are set in a parallel Nicol state, the transmittance at the saturated voltage will have the highest value. In both cases, the transmittance of the liquid crystal cell is saturated near the saturation voltage. As for the point B, it has a maximum transmittance in the crossed Nicol state, as shown in FIG. 2. On the other hand, the point B has a minimum transmittance in a parallel Nicol state. In the present specification, the extremum is used to refer to a maximum or a minimum value. An extremum obtained at the maximum voltage is referred as to a first extremum and an extremum obtained at the second highest voltage is referred as to a second extremum, and so on.

The V-T characteristic shown in FIG. 2 is obtained from an interference phenomenon between the ordinary ray and the extraordinary ray. As a typical display mode utilizing the interference between the ordinary ray and the extraordinary ray of incident light, Electrically Controlled Birefringence (hereinafter, referred to as ECB) mode is known. The operational principle of homogenous ECB mode is as follows. A light beam incident on the liquid crystal cell 28 through the polarizer 25 has a specific polarization direction. When the polarized light beam passes through the liquid crystal cell 28, the retardation (d×Δn) is generated between the ordinary ray and the extraordinary ray of the polarized light beam. Therefore, the polarization direction of the polarized light beam is changed by passing through the liquid crystal cell 28. The analyzer 26 allows a light beam having a specific polarization direction to pass through.

Accordingly, the transmittance of the incident light beam depends on the retardation for the liquid crystal layer 24 and the arrangement of the polarizer 25 and the analyzer 26. Assuming that the thickness of the liquid crystal layer 24 is d, and the difference between the ordinary refractive index ($n_o$) and the extraordinary refractive index ($n_e$), which is generated by the refractive index anisotropy of the liquid crystal layer 24, is Δn, the retardation for the liquid crystal layer 24 is given by the product (d×Δn). An optical response is obtained by electronically changing the retardation (the optical path difference) for the liquid crystal layer 24. The liquid crystal molecules 29 interposed between the pair of substrates 22 and 23, which are in a homogeneous orientation state, rise by applying a voltage E to the liquid crystal cell 28, as shown in FIGS. 3A to 3C. Since an apparent birefringence Δn of the liquid crystal layer 24 changes when the liquid crystal molecules 29 are inclined at an angle, the retardation (d×Δn) changes with it.

FIGS. 3A, 3B and 3C are schematic diagrams showing orientation states of the liquid crystal molecules 29 and energies of orientational deformation of liquid crystal molecules 29 in the respective orientation states as the extension of a spring in the cases where: a voltage less than a threshold voltage is applied; an intermediate voltage is applied; and a voltage close to a saturated voltage is applied, respectively. Since the liquid crystal molecules 29 having a positive dielectric anisotropy have the property to align parallel to the direction of the applied voltage, the orientation direction of the liquid crystal molecules 29 changes in accordance with the strength of the voltage applied to the liquid crystal cell 28 as shown in FIGS. 3A to 3C. The apparent birefringence of the liquid crystal layer 24 changes with the change in the orientation direction of the liquid crystal molecules 29 with respect to the incident light. This phenomenon is described with reference to FIGS. 4A to 4C.

Figure 4A:
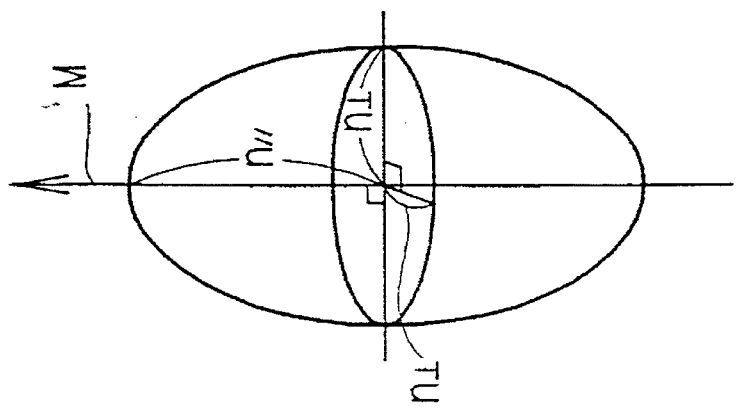
FIGS. 4A to 4C are diagrams illustrating an apparent birefringence Δn when a liquid crystal molecule is inclined with respect to an incident light beam.
Figure 4B:
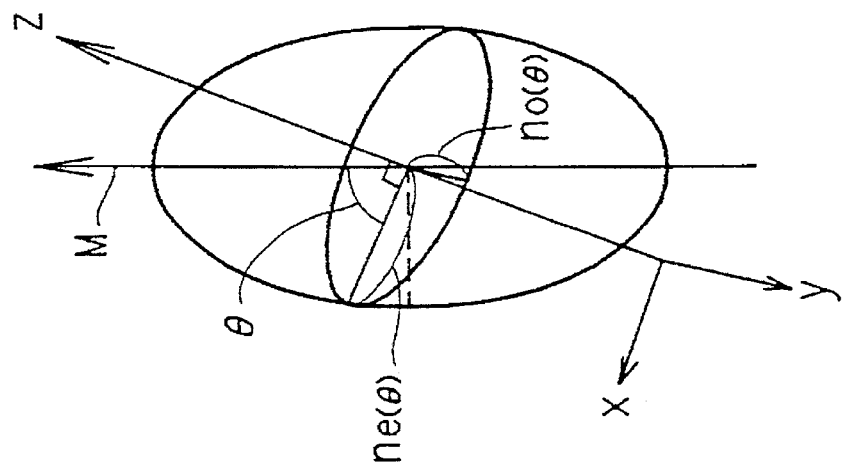
Figure 4C:
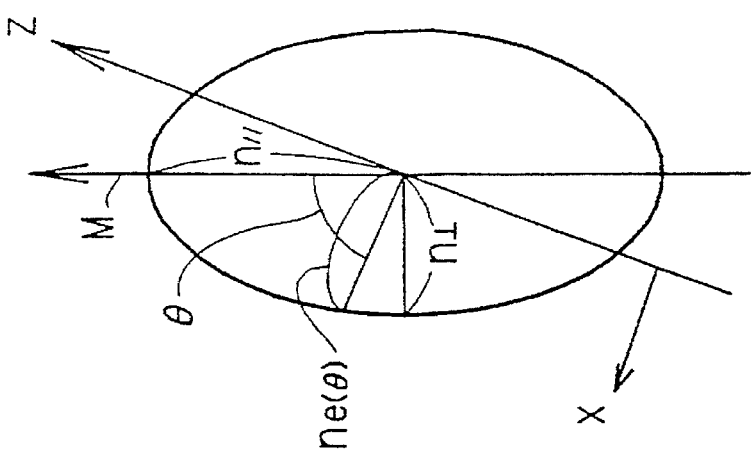

In FIGS. 4A to 4C, an ellipsoid represents a refractive index ellipsoid of a liquid crystal molecule, and an M axis represents a molecular major axis of the liquid crystal molecule. The refractive index for the light having an electric field oscillating in the molecular major axis direction of the liquid crystal molecules is represented by $n_\parallel$, and the refractive index for the light having an electric field oscillating in the direction perpendicular to the molecular major axis of the liquid crystal molecules is represented by $n_\perp$. In FIG. 4B, the z-axis represents a propagation direction of the incident light, and the x-axis and the y-axis represent directions in which the electric fields of the incident light oscillate. As shown in FIG. 4B, in the case where the propagation direction of the incident light is not parallel to the molecular major axis M of the liquid crystal molecule, the refractive index $n_e(\theta)$ for the extraordinary ray having the electric field oscillating in the direction slant from the M axis by θ (in the x-axis direction in FIG. 4B) in the plane including the M axis and the x-axis is given by Formula (1), depending on θ. FIG. 4C shows the relation between $n_e(\theta)$, $n_\perp$ and $n_\parallel$ in the x-z plane of FIG. 4B. On the other hand, the refractive index $n_o(\theta)$ of the ordinary ray having the electric field oscillating in the y-axis direction does not depend on θ and is equal to $n_\perp$, as represented by Formula (2). Therefore, the apparent birefringence Δn(θ) depends on θ, as represented by Formula (3). Thus, the birefringence of the liquid crystal layer varies, depending on the relation between the incident light and the orientation direction of the liquid crystal molecules.

$$n_e(\theta) = n_e' = \frac{n_\perp}{\sqrt{1 - \left\{1 - \left(\frac{n_\perp}{n_\parallel}\right)^2\right\} \cos^2\theta}} \quad (1)$$

$$n_o(\theta) = n_o = n_\perp \quad (2)$$

-continued $$\Delta n(\theta) = n_e' - n_o = \left\{ \frac{1}{\sqrt{1 - \left\{1 - \left(\frac{n_\perp}{n_\parallel}\right)^2\right\} \cos^2\theta}} - 1 \right\} n_\perp \quad (3)$$

$n_\parallel$; refractive index in a molecular major axis direction $n_\perp$; refractive index in a molecular minor axis direction $n_e$; extraordinary refractive index $n_o$; ordinary refractive index In FIG. 5, light propagates in the z-axis direction and passes through the polarizer 25, the liquid crystal layer 24 and the analyzer 26 in this order. The light $I_i$, which passes through the polarizer 25 and is incident on the liquid crystal layer 24, has only an electric field $E_i$ oscillating in the direction parallel to a polarization axis 30 of the polarizer 25. The direction of the director of the liquid crystal molecules in the liquid crystal layer 24 is oriented to the x-axis direction of FIG. 5. The refractive index of the liquid crystal layer 24 with respect to the light having the electric field parallel to the x-axis is represented by $n_e$ and the refractive index of the liquid crystal layer 24 with respect to the light having the electric field parallel to the y-axis is represented by $n_o$. The phase difference of $\Delta n \cdot d$ occurs between components $L_e$ and $L_o$ having the electric fields parallel to the x-axis and the y-axis of the incident light $I_i$ transmitting through the liquid crystal layer 24 having a thickness of d and the birefringence: $\Delta n = n_e - n_o$. In other words, the polarization direction of the light changes. The components of the light, which have the electric field $E_o$ parallel to the polarization axis of the analyzer 26, pass through the analyzer 26.

Furthermore, if the case where the polarization axis 30 of the polarizer 25 is placed at 45° with respect to a director direction of the liquid crystal molecules 29 and an analyzing axis 31 of the analyzer 26 is placed so as to be perpendicular to the polarization axis 30 of the polarizer 25 (crossed Nicol state) is considered, the following expression holds between the retardation ($d \times \Delta n$) and the output light intensity $I_o$.

$$I_o = I_i \sin^2(\Delta n \cdot d\pi/\lambda) \quad (4)$$

Figure 6:
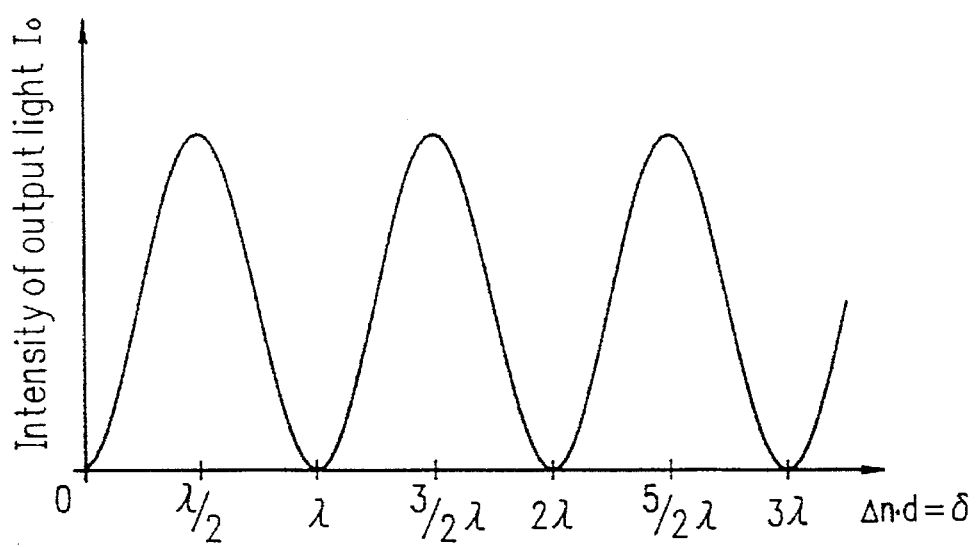
FIG. 6 is a graph showing the relation between an output light intensity $I_o$ and the retardation (d×Δn).

$I_o$: output light intensity $I_i$: incident light intensity $\Delta n \cdot d$: retardation $\lambda$: wavelength of incident light FIG. 6 shows a characteristic curve obtained by the above expression. It is understood from FIG. 6 that at least a retardation ($d \times \Delta n$) of $\lambda/2$ or more is required with respect to the wavelength $\lambda$ of the incident light in order to obtain the maximum on/off ratio for the output light intensity $I_o$.

Figure 7:
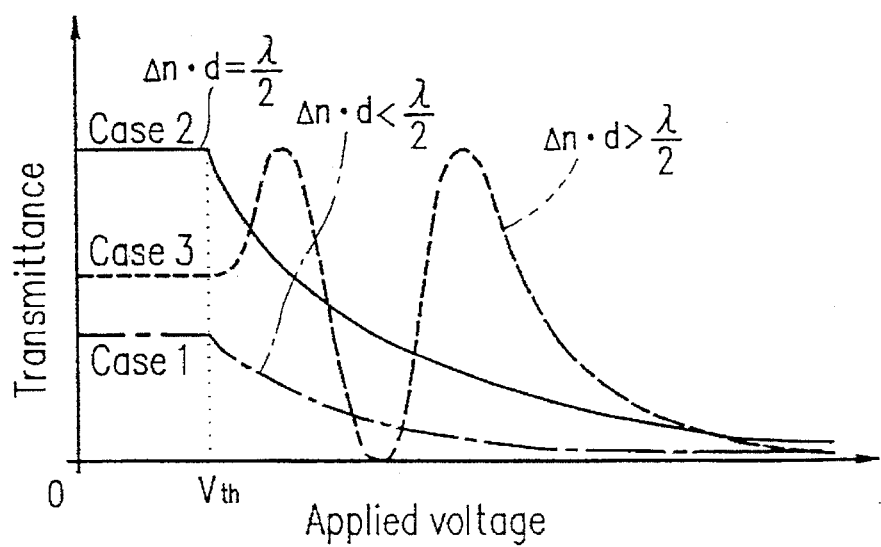
FIG. 7 is a graph showing voltage-transmittance characteristics of liquid crystal cells having for various retardations (d×Δn).

In FIG. 7, three types of V-T characteristic are shown. That is, case 1: $d \times \Delta n < \lambda/2$; case 2: $d \times \Delta n = \lambda/2$; and case 3: $d \times \Delta n > \lambda/2$. As shown in FIG. 7, a sufficient on/off ratio cannot be obtained for the case 1. As for the case 2, only the same V-T characteristic as that of the display mode which utilizes a voltage close to a threshold value, such as a conventional TN-type liquid crystal device, is obtained. Therefore, it is most suitable to use the case 3. It is understood that even a small change in the applied voltage can greatly change the transmitted light intensity.

As described above, the V-T characteristic of ECB mode liquid crystal display 21 having a suitable retardation ($d \times \Delta n$) is as is shown in FIG. 2. In this case, as shown in FIG. 8, the polarization axis 30 of the polarizer 25 is set at 45° with respect to the director direction 32 of the liquid crystal molecules in the liquid crystal layer 24, and the analyzing direction 31 of the analyzer 26 is arranged set to be perpendicular to the polarization axis 30 of the polarizer 25 (crossed Nicol state). In the case where the polarization axis 30 is arranged parallel to the analyzing axis 31 (parallel Nicol state), the change in transmittance of the characteristic of FIG. 2 is reversed.

The method for increasing the response speed of a liquid crystal display will be described below. As shown in FIG. 3, the rise of the liquid crystal molecules 29 corresponds to the stretch of a spring. Normally, when the spring is stretched, the speed of the stretch depends on the force to pull the spring. The force for the spring corresponds to the electric field for the liquid crystal molecules 29. Therefore, the response speed for rising the liquid crystal molecules 29 (the rise speed) can be increased by increasing the applied voltage E. However, it is difficult to increase the response speed for relaxing the liquid crystal molecules 29 (the decay speed). The relaxation time of the orientationally deformed liquid crystal molecules 29 corresponds to the time required for restoring the stretched spring. Since the initial speed for restoring the spring depends on the potential energy of the stretched spring, the highest speed is obtained for the fully stretched spring, which has the maximum potential energy. The fully stretched spring, however, has the longest distance to be in its initial state. Therefore, the fully stretched spring does not lead to the highest response speed in the case of decay. Provided the same analogy for the orientationally deformed liquid crystal molecules, the following phenomenon is understood. When the applied voltage is turned off, the highest response speed can be obtained in the case of above-mentioned mode 0 in the V-T characteristic. However, the mode 0 has the largest degree of deformation in the orientation of the liquid crystal molecules from the initial orientation state. As a result, although the display mode using a voltage close to the threshold value, such as the TN-type LCD, can provide the highest initial decay speed, the overall response speed is slow in the case of decay.

On the other hand, in order to optically switch the on/off states of a liquid crystal device utilizing the birefringence of liquid crystal molecules such as an ECB mode device, the change in the retardation ($\Delta n \cdot d$: $\Delta n$=refractive index anisotropy of liquid crystal, d=cell gap) in accordance with the orientational deformation of liquid crystal molecules for at least a half wavelength is sufficient. Therefore, if $\Delta n \cdot d/\lambda > 1/2$ is satisfied, the relaxation from the mode 0 to the initial state is not necessary. That is, the orientational deformation is not required to relax to the initial orientation state. In particular, if $\Delta n$ of the liquid crystal layer is large and $\Delta n \cdot d > 3\lambda/2$ is satisfied, as is shown by the curve representing case 3 in FIG. 7, optically sufficient contrast can be obtained even if the orientational deformation of the liquid crystal molecules is minute. This result in the highest response speed.

As mentioned above, for the transmissive liquid crystal device, by setting the retardation ($d \times \Delta n$) for the liquid crystal layer to satisfy the relation:

$$d \times \Delta n > \lambda/2,$$

a high contrast ratio and a high response speed can be obtained. As for a reflective liquid crystal device where the incident light passes through the liquid crystal layer twice continuously without passing through the polarizing element, the relation to obtain a high contrast ratio and a high response speed is expressed as $$2d\times\Delta n > \lambda/2.$$

If the present example is adapted to the reflective liquid crystal display device where the incident light is output from the analyzing element after passing through the liquid crystal layer twice, the retardation caused by the optical path is equivalent to that for a transmissive liquid crystal device where the thickness of the liquid crystal cell is doubled. Therefore, the following relation holds between the retardation ($d\times\Delta n$) and the output light intensity $I_o$.

$$I_o = I_i \cdot \sin^2(\Delta n \cdot 2 d\pi/\lambda) \qquad (5)$$

In the present specification, the output light intensity refers to the transmitted light intensity for the transmissive device and the reflected light intensity for the reflective device. The voltage-transmittance characteristics as shown in FIGS. 2 and 7 may be referred to as the voltage-output light intensity characteristics so as to include the optically equivalent voltage-reflectance characteristics.

For the reflective liquid crystal device, the case corresponding to those of FIG. 7 are: case 1: $d\times\Delta n<\lambda/4$; case 2: $d\times\Delta n=\lambda/4$; and case 3: $d\times\Delta n>\lambda/4$, respectively.

As described above, the liquid crystal device having an adequate retardation can be driven by applying the voltage to the pixels in the field sequential addressing method so that optical on/off states are switched by applying a maximum voltage corresponding to the extremum value (maximum value or minimum value) of the light transmittance in the V-T characteristic and the saturation voltage higher than the maximum voltage. In the case where $\Delta n \cdot d > \lambda$, preferably $\Delta n \cdot d > 3\lambda/2$, is satisfied and a plurality of extrema are obtained in the V-T characteristic, the on/off switching may be performed between the first extremum and the second extremum, as long as sufficient response speed is obtained.

By utilizing the highly deformed orientation state (mode 0), the liquid crystal device according to this example can provide a high response speed as well as a high contrast ratio. It is preferable that each of a rise time and a decay time of the optical response is one-fifth or less than a display period.

EXAMPLE 2

FIG. 9 is a cross-sectional view showing a configuration of a liquid crystal display device 40 according to a second example of the present invention. The liquid crystal display device 40 includes a liquid crystal cell 45 having a pair of substrates 45a and 45b, a liquid crystal layer 44 interposed between the pair of substrates 45a and 45b. On the sides of the liquid crystal cell 45, a polarizer 47 and an analyzer 48 are provided. A driving voltage supplying portion 46 supplies a driving voltage to the liquid crystal cell 45.

In this example, the driving voltage supplying portion 46 supplies a driving voltage waveform which applies a first preliminary voltage having an absolute value larger than a signal voltage before applying a signal voltage for obtaining a predetermined output light intensity (transmittance or reflectance) to the liquid crystal cell 45.

A fabrication method of the liquid crystal cell 45 will be described. An ITO film 42a having a thickness in the range of 0.1 to 1.1 μm is formed by using a sputtering method on a glass substrate (trade name: 7059, manufactured by Corning Inc.) 41a having a thickness of 1.1 mm. The ITO film 42a on the substrate 41a is etched into an electrode with a desired shape (character, figure, matrix or the like) by using a photolithography process. Another ITO film 42b is formed on the entire surface of another glass substrate 41b in the same manner so as to form a counter electrode. Alignment films (trade name: Optomer AL4552, manufactured by Japan Synthetic Rubber Ltd.) 43a and 43b are formed over the surfaces of the substrates 45a and 45b. After being cured at 230° C., the alignment films 43a and 43b are subject to the rubbing treatment so that the rubbing directions become antiparallel when the pair of substrates 41a and 41b are attached to each other to form the liquid crystal cell 45.

After the alignment treatment, a liquid crystal sealing layer (not shown) is formed by a screen printing method using an adhesive sealing material, in which glass fiber having a diameter of 4.5 μm is mixed. Then, the pair of substrates 45a and 45b are attached to each other by the liquid crystal sealing layer interposing a glass beads spacer (not shown) having a diameter of 4 μm between them. A liquid crystal material is injected to a gap between the pair of substrates 45a and 45b by a vacuum injection method so as to obtain the liquid crystal layer 44. The reference numeral 49 denotes a director direction of the liquid crystal molecules in the liquid crystal layer 44. The liquid crystal material used in this example is BL035 (manufactured by Merck & Co., Inc.: $\Delta n=0.267$). Other liquid crystal materials may be used.

Figure 10A:
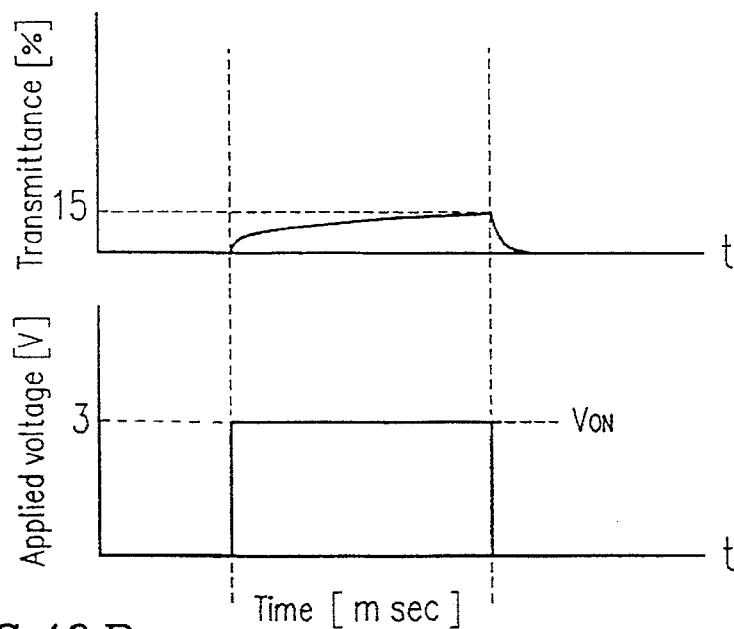
FIGS. 10A and 10B are graphs showing driving voltage waveforms and optical response waveforms in the case where a signal voltage $V_{on}$ alone is applied to a liquid crystal cell and in the case where a driving voltage waveform according to the second example is applied to the liquid crystal cell, respectively.
Figure 10B:
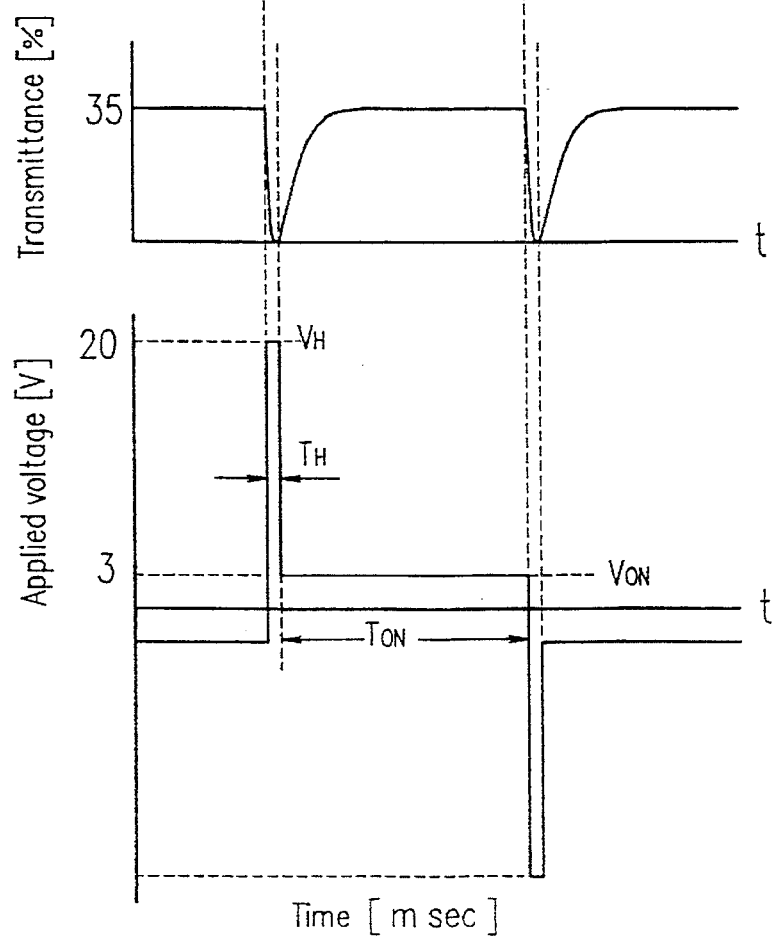

The optical response characteristics in the cases where a signal voltage $V_{on}$ alone is applied and where the driving voltage waveform is applied are shown in FIGS. 10A and 10B, respectively. FIG. 10A shows the case where the signal voltage: $V_{on}=3$ V, which is a step voltage, is applied, and FIG. 10B shows the case where the first preliminary voltage $V_H$ and the signal voltage $V_{on}$ are applied in this order. In this experiment, the measurement of the optical characteristics is carried out under the following conditions: the first preliminary voltage $V_H=20$ V; time period $T_H$ for applying the first preliminary voltage $V_H=0.25$ msec; and time period $T_{on}$ for applying the signal voltage $V_{on}=4.75$ msec. As a result, as shown in FIG. 10A, the liquid crystal display device does not have an optically sufficient response in the case where the signal voltage $V_{on}$ alone is applied. That is, the response speed is not sufficiently fast, resulting in that the transmittance does not reach the desired value (35%). However, in the case where the first preliminary voltage $V_H$ and the signal voltage $V_{on}$ are used, as in FIG. 10B, the optically sufficiently high response speed is obtained.

In this case, the time period $T_H$ for applying the first preliminary voltage $V_H$ is required to be shorter than the time period $T_{on}$ for applying the signal voltage $V_{on}$ which is a display signal. Preferably, it is desirable that the time period $T_H$ for applying the first preliminary voltage $V_H$ is one-fifth or less than the time period $T_{on}$ for applying the signal voltage $V_{on}$.

Although the display mode of the liquid crystal used in this example is homogeneous EBC mode, the display mode utilizing the birefringence such as Super-Twisted Nematic (STN) may be used. An oblique vapor deposition method may be used as well as the rubbing method as an alignment controlling method. In this example, although both of the substrates are glass substrates, one of them may be an opaque substrate such as a semiconductor substrate for a reflective device.

EXAMPLE 3

In this example, a second preliminary voltage $V_L$ having an absolute value smaller than that of a signal voltage $V_{on}$ is applied between the application of the signal voltage $V_{on}$ and a first preliminary voltage $V_H$ having an absolute value larger than the signal voltage $V_{on}$.

Figure 11A:
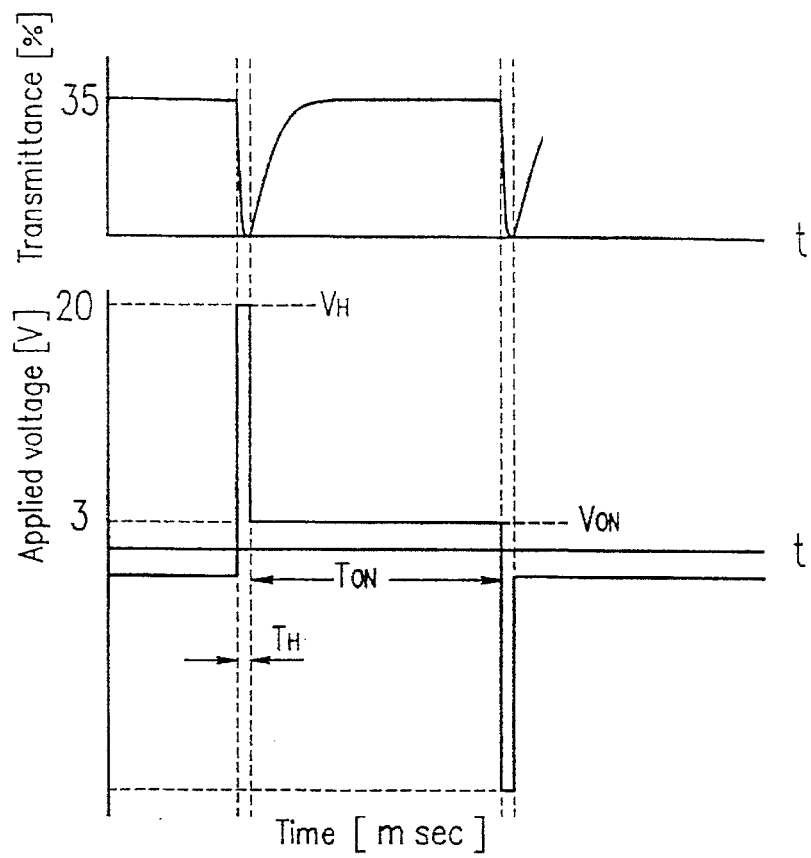
FIGS. 11A and 11B are graphs showing driving voltage waveforms and optical response waveforms in the case where a second preliminary voltage $V_L$ according to a third example is not present between a first preliminary voltage $V_H$ and the signal voltage $V_{on}$ of the second example and in the case where the second preliminary voltage $V_L$ is present between the first preliminary voltage $V_H$ and the signal voltage $V_{on}$ of the second example, respectively.
Figure 11B:
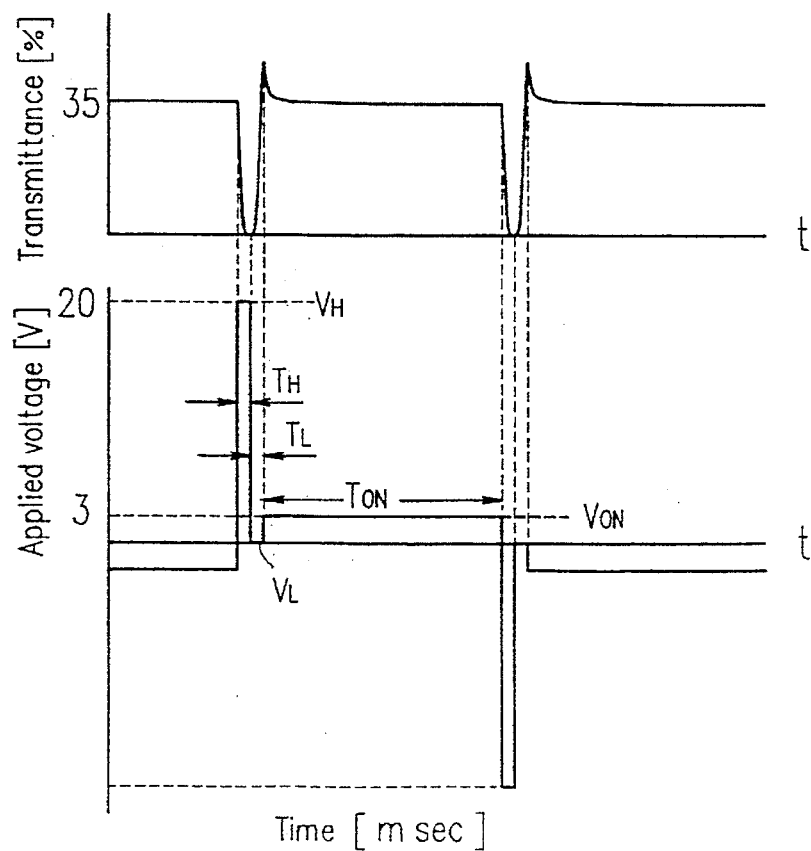

The comparison between the optical response characteristics of the cases where a second preliminary voltage $V_L$ is present and is not present between the first preliminary voltage $V_H$ and signal voltage $V_{on}$ are shown in FIGS. 11A and 11B, respectively, using the liquid crystal cell similar to the liquid crystal cells 45 which are formed according to the second example. FIG. 11A shows the case where the second preliminary voltage $V_L$ is not present, and FIG. 11B shows the case where the second preliminary voltage $V_L$ is present. In this experiment, the measurement of the optical characteristics is carried out under the following conditions: the first preliminary voltage $V_H$=20 V; the second preliminary voltage $V_L$=0 V; a signal voltage $V_{on}$=3 V; time period $T_H$ for applying the first preliminary voltage $V_H$=0.25 msec; time period $T_L$ for applying the second preliminary voltage $V_L$=0.25 msec; and time period $T_{on}$ for applying the signal voltage $V_{on}$=4.5 msec. As a result, as shown in FIGS. 11A and 11B, the distortion present in the waveform of the optical response characteristic can be eliminated by providing the time period for applying the second preliminary voltage $V_L$ between the time period for applying the first preliminary voltage $V_H$ and the signal voltage $V_{on}$.

As described above, the optical response speed becomes higher by applying the first preliminary voltage $V_H$ having an absolute value larger than at least that of the signal voltage $V_{on}$ and further applying the second preliminary voltage $V_L$ having an absolute value smaller than at least that of the signal voltage $V_{on}$ before applying the signal voltage $V_{on}$ for obtaining the predetermined transmittance and reflectance to the respective pixels constituting the liquid crystal display.

In this case, it is necessary that the time period $T_H$ for applying the first preliminary voltage $V_H$ and the time period $T_L$ for applying the second preliminary voltage $V_L$ are shorter than the time period $T_{on}$ for applying the signal voltage $V_{on}$ which is a display signal, respectively. Preferably, it is desirable that the total of the time periods for applying the first preliminary voltage $V_H$ and the second preliminary voltage $V_L$, i.e., $T_H+T_L$, is one-fifth or less than the time period $T_{on}$ for applying the signal voltage.

Figure 12:
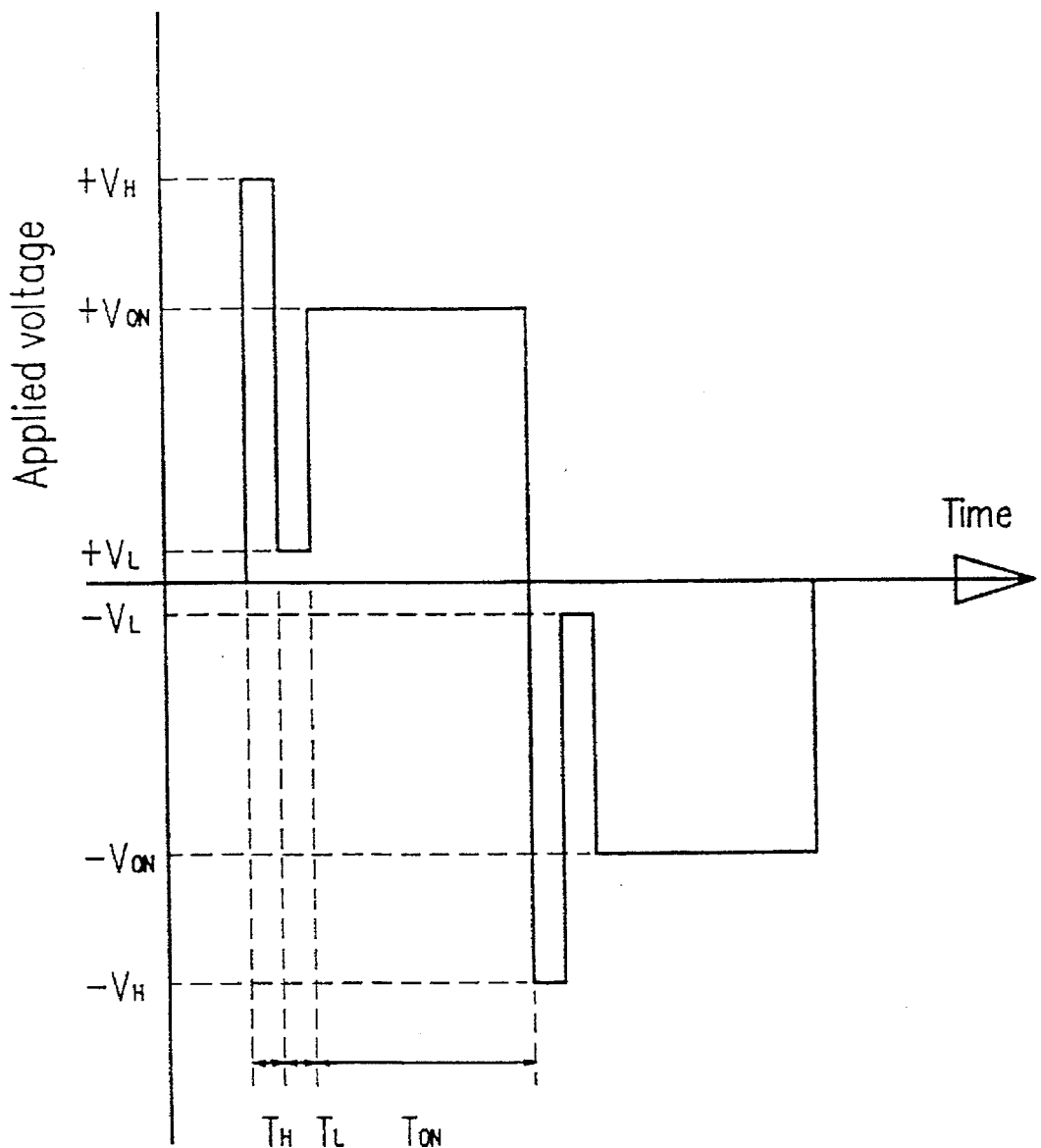
FIG. 12 is a diagram showing another driving voltage waveform according to a third example of the present invention.

In the third example described above, the display is performed in the following manner. The first preliminary voltage $V_H$ for changing the molecular orientation to the mode 0 is constantly applied immediately before performing the display, as shown in FIG. 12, utilizing the liquid crystal having $\Delta n$ satisfying the above-mentioned condition: $d \times \Delta n > \lambda/2$ or $2d \times \Delta n > \lambda/2$. Then, the liquid crystal molecules are relaxed by the second preliminary voltage $V_L$ which is lower than the voltage corresponding to the first peak in the V-T characteristic after applying the first preliminary voltage $V_H$. Thereafter, the display is performed by the applied signal voltage $V_{on}$. At this moment, since the first preliminary voltage $V_H$ is required to make the orientational state of the liquid crystal molecules be in mode 0 as an optical response, the voltage V is preferably higher than the voltage $V_1$, which is a saturation voltage in the V-T characteristic. Considering that the speed in the orientational change of the liquid crystal molecules increases with the increase of the applied voltage, as described before, the liquid crystal molecule orientation is transitioned to mode 0 with a higher speed in the case where the first preliminary voltage $V_H \geq V_1$. The speed of relaxation is increased as the second preliminary voltage $V_L$ becomes closer to 0 V since the difference in the potentials of the liquid crystal molecules becomes wider. Since the first and second preliminary voltages $V_H$ and $V_L$ are not used for displaying an image, the quality of the display image is deteriorated if $T_H+T_L$, which is the time period for applying the preliminary voltages, is unnecessarily long. However, the inventors confirmed the following fact by experiment. In view of the response characteristic and display quality of the liquid crystal display device itself, if the maximum value of time period $T_H+T_L$ for applying the voltages is one-fifth or less than the time period $T_{on}$ for applying the display signal in one field, the conspicuous deterioration is not observed. Regarding the minimum value, since it is desirable to apply the first and second preliminary voltages for the time period in which the orientational change in the liquid crystal molecules can transition as described above, it is preferable to optimize each physical constant, such as viscosity and elasticity of the liquid crystal materials.

Although the display mode of the liquid crystal used in this example is homogeneous EBC mode, the display mode utilizing the birefringence such as STN may also be used. An oblique vapor deposition method can also be used as well as the rubbing method as an orientation controlling method. In this example, although both of the substrates are glass substrates, one of them may be an opaque substrate such as a semiconductor substrate for a reflective device.

EXAMPLE 4

A liquid crystal cell capable of being driven with a lower voltage is shown as a fourth example. In the graph of FIG. 2, since the transmittance of the mode 0 is not completely saturated and therefore the transmittance does not reach the minimum value, a sufficiently high contrast ratio may not be obtained. Since the liquid crystal molecules at a surface of a substrate are under a strong influence of an anchoring, as compared with the bulk liquid crystal molecules in the middle of a liquid crystal layer in the thickness direction, the orientational change of the liquid crystal molecules at the surface does not occur unless an extremely high voltage is applied. Thus, as shown in FIG. 3C, although the bulk liquid crystal molecules rise, the liquid crystal molecules at the surface of the substrates remain in the initial orientation state. In such a state, since the retardation of the liquid crystal molecules at the surface remain, the leakage of light occurs. In order to obtain the transmittance of around 0% at mode 0, an extremely high voltage (several tens V or more) is necessary. A display method using such a high voltage is not preferable because the voltage ratio for on/off switching is increased for the driving voltage.

Figure 13:
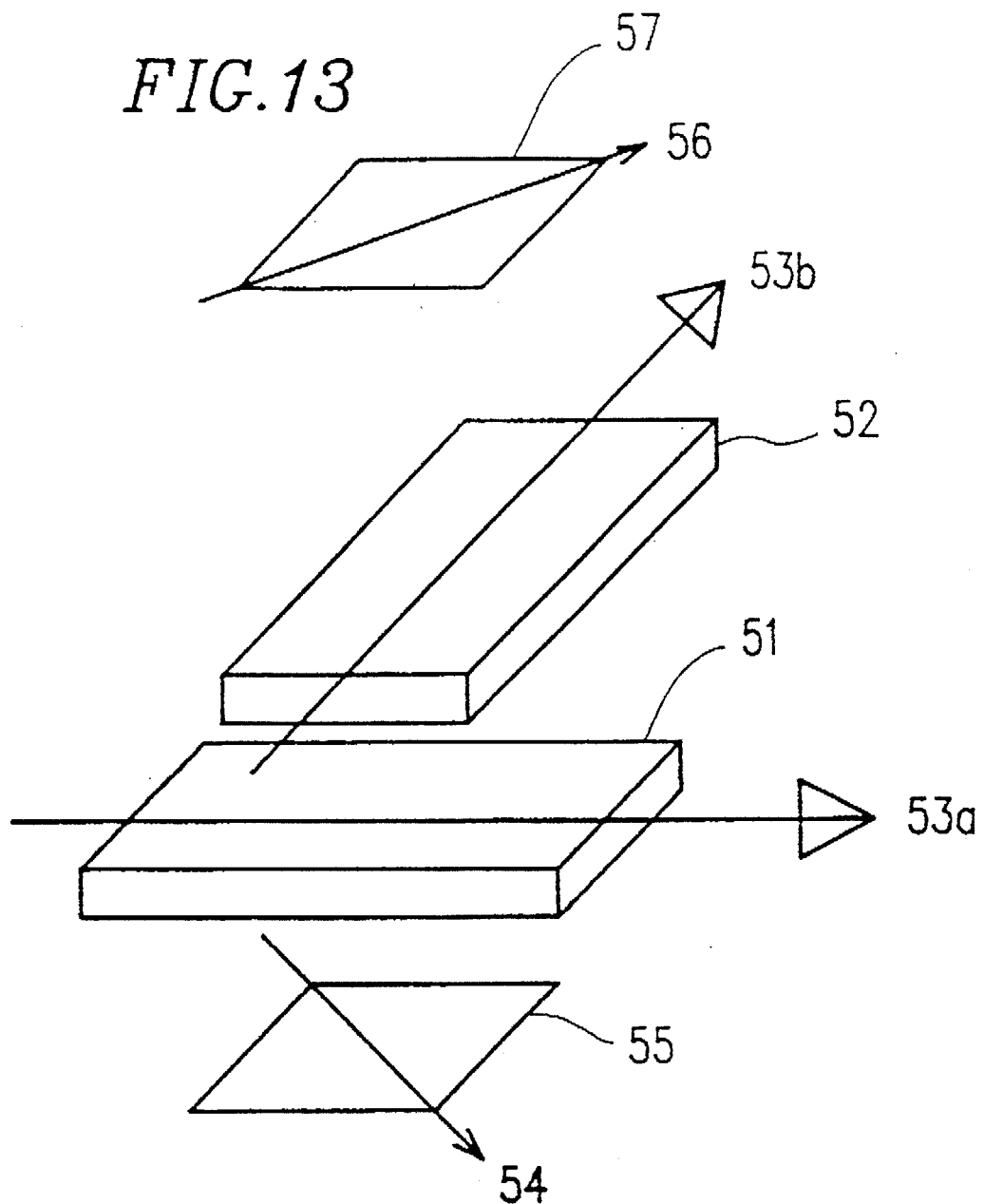
FIG. 13 is a diagram showing a configuration of a liquid crystal cell of a liquid crystal display device according to a fourth example of the present invention.

A configuration of a liquid crystal device as an example of solutions of the above problem is shown in FIG. 13. A method for solving the problem is as follows. A liquid crystal cell 51 on the driving side used for displaying image and an equivalent liquid crystal cell 52 on the compensation side are overlapped with each other so that the rubbing directions (the direction of directors of the liquid crystal molecules) 53a and 53b are perpendicular to each other in FIG. 13. The retardation of the liquid crystal cell 51 on the driving side is compensated by the retardation of the liquid crystal cell 52 on the compensation side. In this example, the reference numerals 54 and 56 denote a polarization axis of the polarizer 55 and an analyzing axis of the analyzer 57, respectively.

Figure 14:
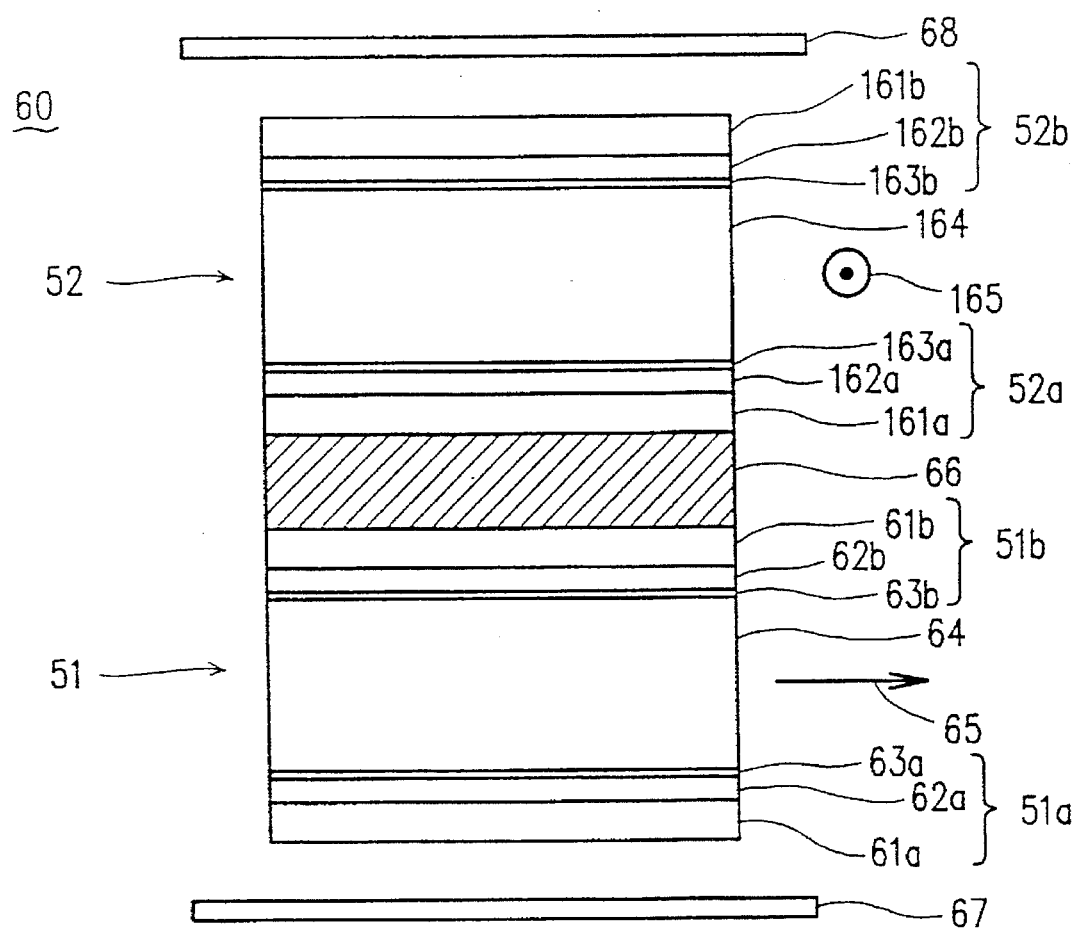
FIG. 14 is a cross-sectional view showing a configuration of a liquid crystal cell of a liquid crystal display device according to a fourth example of the present invention.

The fourth example in accordance with the compensation method will be described with reference to FIG. 14. The liquid crystal cell 51 on the driving side is obtained in the following manner. A substrate 51a is obtained by forming an ITO film 62a by using a sputtering method having a thickness in the range of 0.1 to 1.1 µm on a glass substrate (trade name: 7059, manufactured by Corning Inc.) 61a having a thickness of 1.1 mm. The ITO film 62a on the glass substrate 61a is etched to form a strip electrode by using a photolithography process. Liquid crystal alignment films (trade name: Optomer AL4552, manufactured by Japan Synthetic Rubber Ltd.) 63a and 63b are applied to the thus formed substrate 51a and another substrate 51b having a strip electrode formed of ITO film 62b on a glass substrate 61b in the same manner. After being cured at 230° C., the pair of substrates 51a and 51b are subject to the rubbing treatment so that the rubbing directions become antiparallel when the pair of substrates 51a and 51b are attached to each other.

After the alignment treatment, a liquid crystal sealing layer (not shown) is formed by a screen printing method using an adhesive sealing material, in which glass fiber having a diameter of 4.5 µm is mixed. Then, the pair of the substrates 51a and 51b are attached to each other by the liquid crystal sealing layer interposing a glass beads spacer (not shown) having a diameter of 4 µm between them. The pair of substrates 51a and 51b are attached to each other so that the strip electrodes are perpendicular to each other and the rubbing directions are antiparallel to each other. Portions of the liquid crystal cell 51 where the strip electrodes overlap function as pixels. A liquid crystal material is injected to a gap between the pair of substrates 51a and 51b by a vacuum injection method so as to obtain the liquid crystal layer 64. The liquid crystal material used in this example is BL035 (manufactured by Merck & Co., Inc.: $\Delta n=0.267$).

The liquid crystal cell 52 is fabricated in the same manner as the liquid crystal cell 51. However, ITO films 162a and 162b formed on glass substrate 161a and 161b are not etched to form the strip electrodes. The surface of substrates 52a and 52b are covered by alignment films 163a and 163b, respectively. A liquid crystal layer 164 sandwiched between the pair of substrates 52a and 52b are aligned so that the director 165 is perpendicular to the director 65 of the liquid crystal layer 64.

The liquid crystal cell 51 including the ITO films 62a and 62b having electrodes with a certain shape is called the driving liquid crystal cell 51, and the other is called the compensating liquid crystal cell 52. The pair of liquid crystal cells 51 and 52 are overlapped with each other so that the directors 65 and 165 of the liquid crystal molecules are perpendicular to each other. Then, the pair of liquid crystal cells 51 and 52 are attached to each other by using an adhesive resin 66 having the same refractive index and spectral characteristic as those of the insulating substrates 161b and 161a. A polarizer 67 and an analyzer 68 are provided on the sides of the combined liquid crystal cells.

Figure 15:
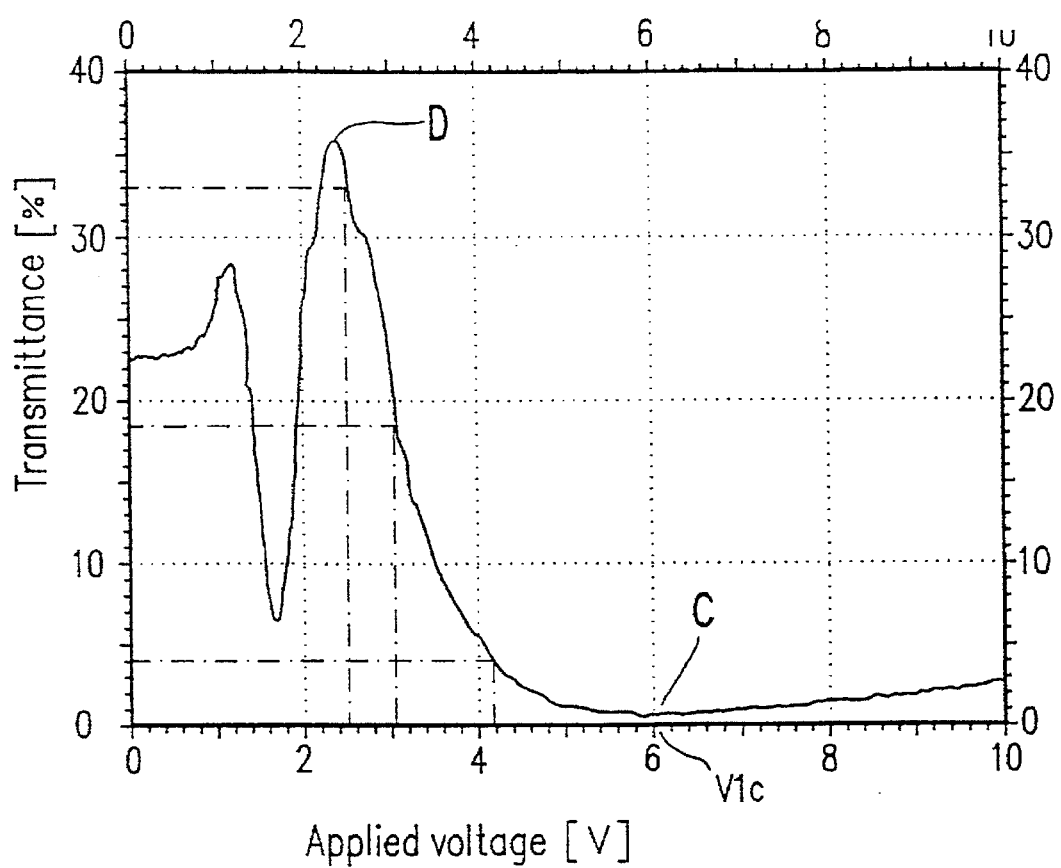
FIG. 15 is a graph showing a voltage-transmittance characteristic of the liquid crystal cell shown in FIG. 14 in the case where a compensating liquid crystal cell is used.

The voltage-light transmittance characteristic of the liquid crystal device 60 is shown in FIG. 15. The voltage applied to the compensating liquid crystal cell 52 is a voltage $V_{1c}$ (hereinafter, the point C is referred to as a pseud mode 0) at which the transmittance becomes minimum in the V-T characteristic of the liquid crystal device 60 having the driving liquid crystal cell 51 and the compensating liquid crystal cell 52. The pseud mode 0 corresponds to the mode 0, which moves to the low voltage side due to the compensating liquid crystal cell 52. A point D represents the first peak value having the maximum transmittance.

Figure 16A:
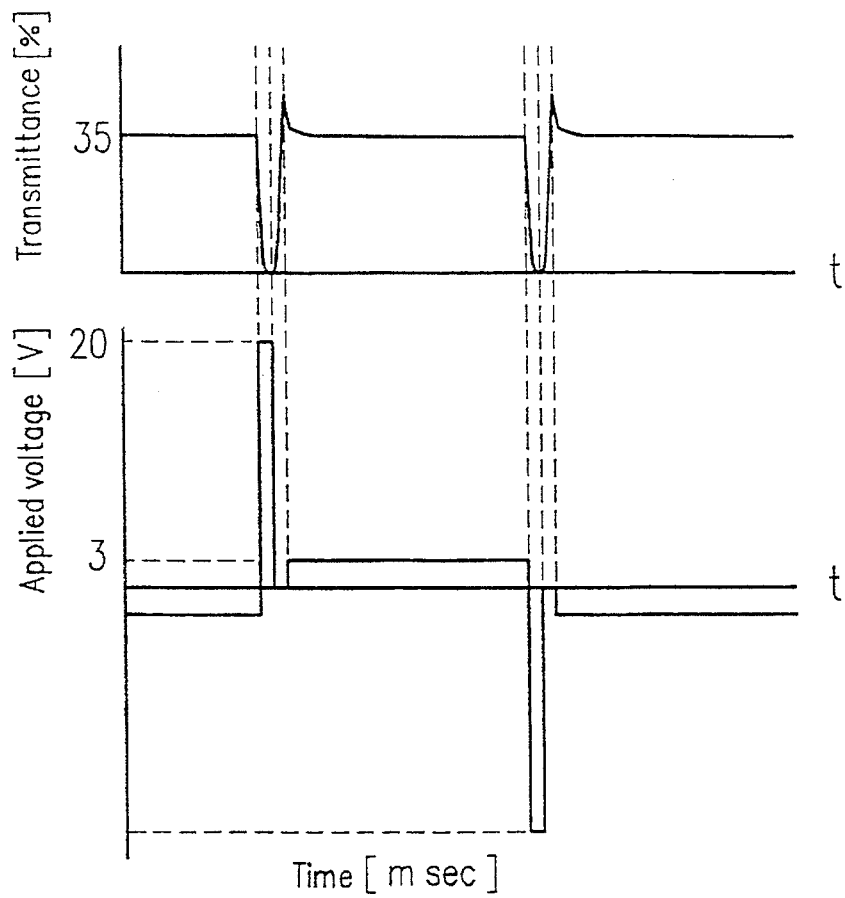
FIGS. 16A and 16B are graphs showing optical response characteristics and driving voltage waveforms in the case where a compensating liquid crystal cell of the third example is not used, and in the case where a compensating liquid crystal cell of the fourth example according to the present invention is used, respectively.
Figure 16B:
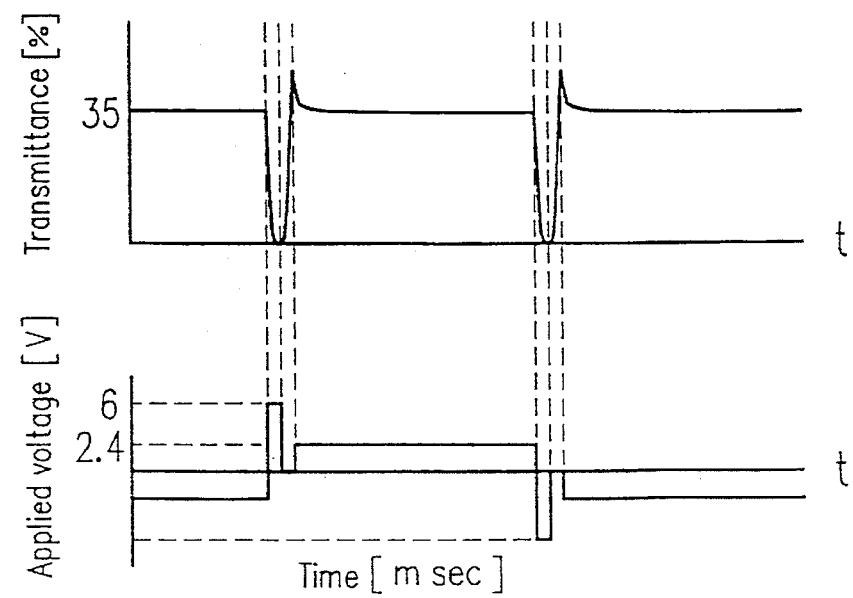

The driving voltage waveforms and the optical response characteristics of the cases where the compensating liquid crystal cell 52 is used and is not used are shown in FIGS. 16A and 16B, respectively. In this experiment, the measurement of the transmittance in FIG. 16A is conducted under the following conditions: the first preliminary voltage $V_H=20$ V; the second preliminary voltage $V_L=0$ V; and the signal voltage $V_{on}=3$ V. The measurement in FIG. 16B is conducted under the following conditions: the first preliminary voltage $V_H=6$ V; the second preliminary voltage $V_L=0$ V; and the signal voltage $V_{on}=2.4$ V. Furthermore, both measurements are conducted under the following conditions: time period $T_H$ for applying the first preliminary voltage $V_H=0.25$ msec; time period $T_L$ for applying the second preliminary voltage $V_L=0.25$ msec; and time period $T_{on}$ for applying the signal voltage $V_{on}=4.5$ msec.

As a result, the same optical response can be obtained with a lower driving voltage as shown in FIGS. 16A and 16B by providing the compensating liquid crystal cell 52 as a retardation compensation means for compensating the retardation for the liquid crystal cell 51.

In this example, although the glass substrates 61a and 61b are used for both substrates of the driving liquid crystal cell 51, the glass substrate 61a may be an opaque substrate such as a silicon substrate for a reflective device. Although the display mode of the liquid crystal display device 60 of this example is a homogeneous EBC mode, the display mode utilizing the birefringence, such as STN mode, may also be used. An oblique vapor deposition method may be used as well as the rubbing method as an alignment controlling method. Furthermore, although the compensation liquid crystal cell 52 fabricated under the same conditions of the liquid crystal cell 51 is used in this example, a uniaxial or biaxial orientation film as a phase plate may also be used. The retardation of the phase plate is preferably equal to that of the driving liquid crystal cell at mode C.

EXAMPLE 5

A specific driving method with a driving voltage waveform of the present invention in the case of the homogeneous EBC mode using the active matrix method will be described as a fifth example, with reference to FIGS. 17, 18 and 19.

Figure 17:
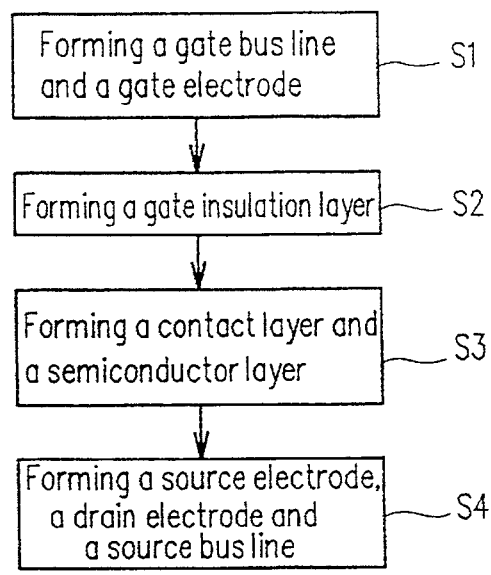
FIG. 17 is a flow chart showing a process for fabricating TFTs of a liquid crystal display device according to a fifth example of the present invention.
Figure 18:
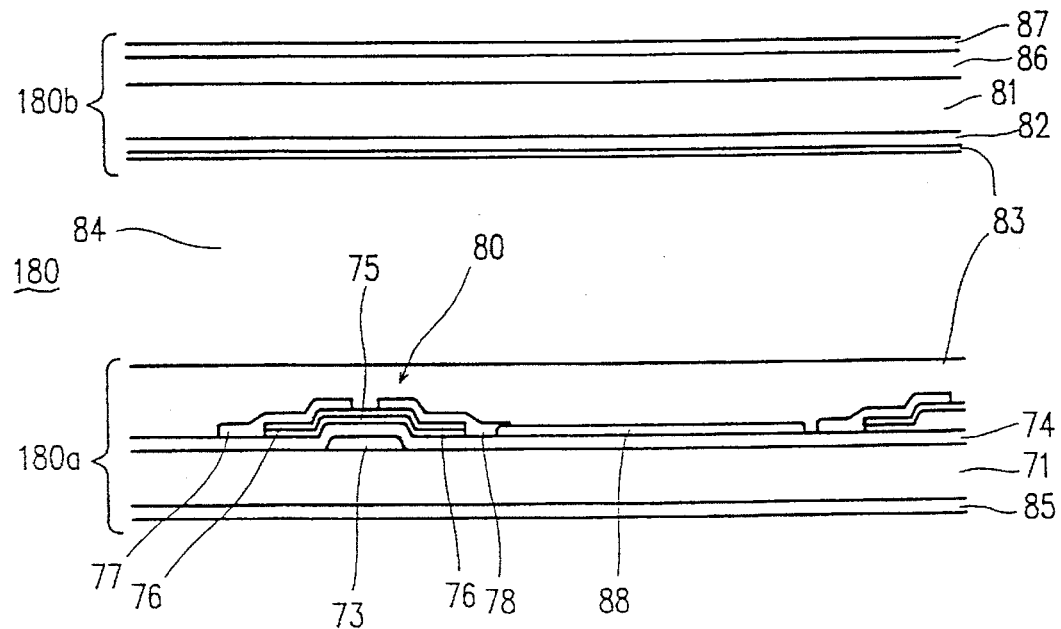
FIG. 18 is a cross-sectional view of a liquid crystal display device according to a fifth example of the present invention.
Figure 19:
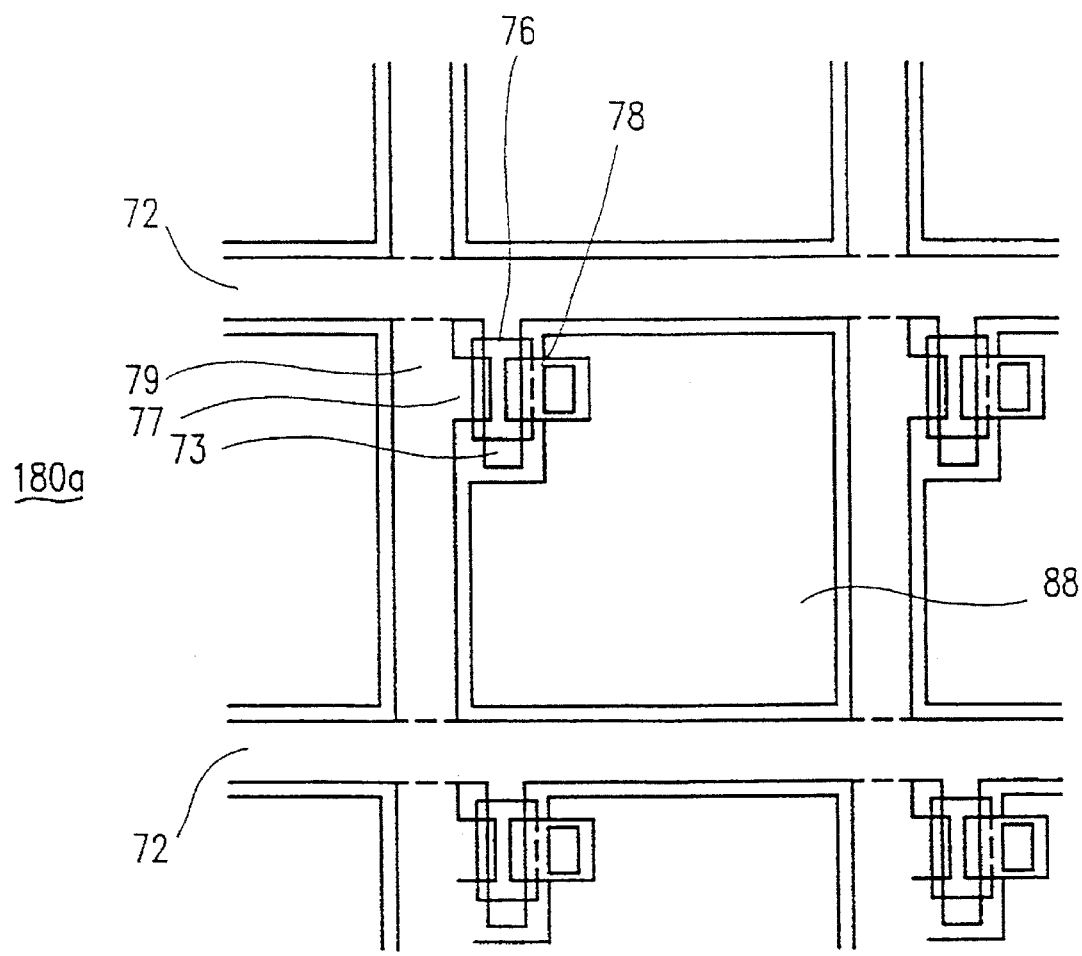
FIG. 19 is a plane view of a liquid crystal display device using a TFT substrate according to the fifth example of the present invention.

FIG. 17 shows the fabrication process of TFTs which are active elements in the fifth example, FIG. 18 is a cross-sectional view of a liquid crystal display cell 180 in the fifth example, and FIG. 19 is a plane view of an active matrix substrate 180a of the liquid crystal display cell 180 in the fifth example. As shown in FIGS. 17 to 19, at step S1, a Ta metal layer having a thickness of 300 nm is formed on an insulating substrate 71 made of glass by a sputtering method. Then, the patterning of the metal layer is performed by using a photolithography process and an etching process, thereby forming a gate bus wiring 72 and a gate electrode 73. Next, at step S2, a gate insulating film 74 made of SiNx having a thickness of 400 nm is formed by a plasma Chemical Vapor Deposition method. At step S3, an a-Si layer having a thickness of 100 nm to be a semiconductor layer 75 and an n⁺-type a-Si layer having a thickness of 40 nm to be a contact layer 76 are successively formed in this order by the plasma CVD method. Then, the patterning of the n⁺-type a-Si layer and the a-Si layer is performed, thereby forming the contact layer 76 and the semiconductor layer 75. At step S4, a Mo metal layer having a thickness of 200 nm is formed by a sputtering method. Then, the patterning of the Mo metal layer is performed, thereby forming a source electrode 77, a drain electrode 78 and a source bus line 79. The drain electrode 78 are connected to a pixel electrode 88. The source bus line 79, which functions as a signal line, is connected to the source electrode 77 which functions as an input terminal of the TFT 80. With the above process, the active matrix substrate 180a having the TFT 80 is obtained.

A method for producing the liquid crystal display cell 180 using the active matrix substrate 180a will be described. A counter substrate 180b is obtained by forming an ITO film 82 with a thickness in the range of 0.1 to 1 µm on a glass substrate 81 (trade name: 7059, manufactured by Corning Inc.) having a thickness of 1.1 mm by using a sputtering method. The ITO film 82 is patterned to form a plurality of counter electrodes in strips. After liquid crystal alignment films (trade name: Optomer AL4552, manufactured by Japan Synthetic Rubber Ltd.) 83 are applied to cover the substrates 180a and 180b. Then the substrates 180a and 180b are cured at 230° C. The pair of substrates 180a and 180b are subject to the rubbing treatment so that the rubbing directions become antiparallel to each other when the pair of substrates 180a and 180b are attached to each other. An adhesive sealing material having a thickness of 4.5 µm, in which glass fiber is mixed, is used to form a liquid crystal sealing layer (not shown) by the screen printing method. The pair of the substrates 180a and 180b are attached to each other by the liquid crystal sealing layer, interposing a glass beads spacer (not shown) having a thickness of 4 µm therebetween. The substrates 180a and 180b are attached to each other so that the strip electrodes are parallel to the gate bus line 72 and overlaps with the pixel electrode 88. Then, a liquid crystal material is injected between the pair of the substrates 180a and 180b to form a liquid crystal layer 84 by vacuum injection method. The liquid crystal used in this example is BL035 (manufactured by Merck & Co., Inc.: $\Delta n=0.267$).

A polarizer 85 is formed on the light entering side of the thus fabricated liquid crystal display cell 180. A phase plate 86 and an analyzer 87 are provided in this order on the light outputting side of the liquid crystal display cell 180.

Figure 20:
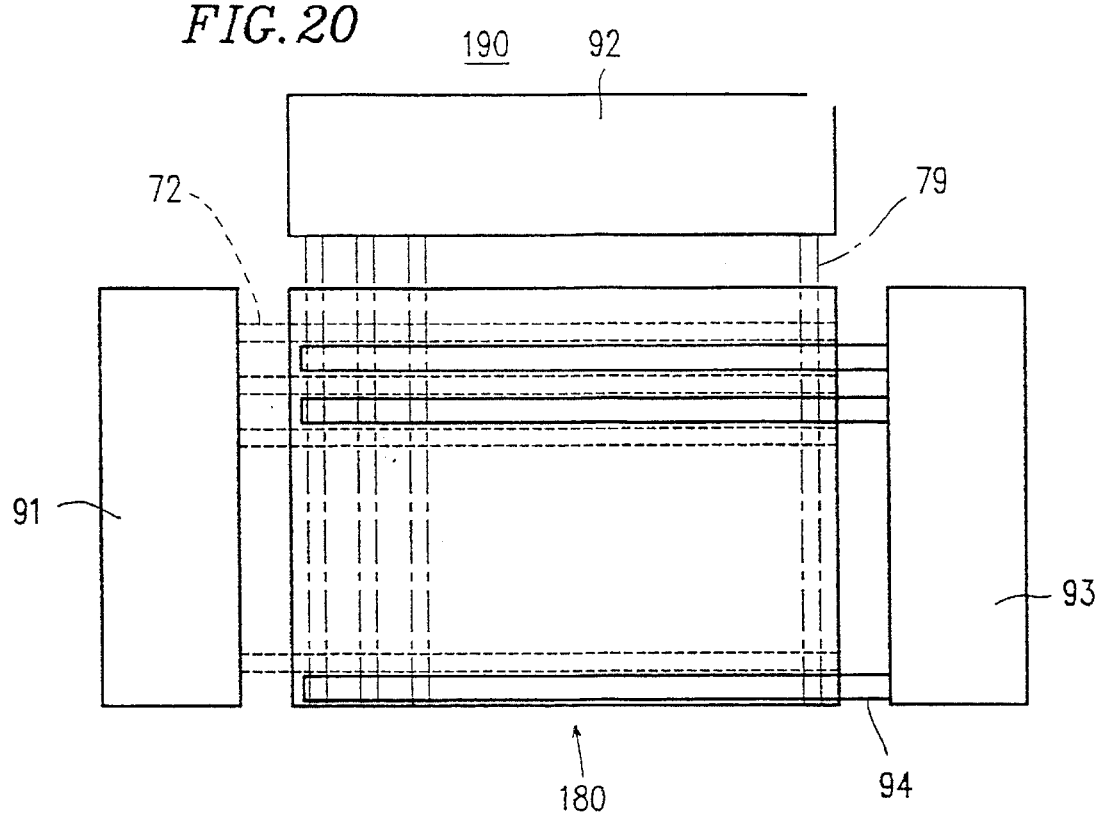
FIG. 20 is a schematic diagram showing a configuration of AM-LCD using TFTs according to the fifth example of the present invention.

A driving method for driving an active matrix liquid crystal display device 190 (hereinafter, referred to as AM-LCD) with the driving voltage waveform according to the present invention will be described. FIG. 20 shows an entire structure of the AM-LCD 190 according to the fifth example. As shown in FIG. 20, the AM-LCD 190 includes the active matrix liquid crystal cell 180, a gate driving circuit 91, source driving circuit 92 and a counter electrode driving circuit 93. The active matrix liquid crystal cell 180 is driven by the gate driving circuit 91 and the source driving circuit 92 using a line sequential addressing method. The counter substrate 180b of the active matrix liquid crystal cell 180 has a plurality of strip counter electrodes 94 arranged to be parallel to the gate bus line 72. Therefore, it is possible to apply a counter voltage to the counter electrodes line by line synchronizing with a timing of the application of the gate voltage to the corresponding gate bus line 72. The counter voltage is supplied by the counter electrode driving circuit 93.

FIGS. 21A through 21C are time-charts of the driving voltage waveform of the present invention. FIG. 21A, 21B and 21C show a gate voltage 191, a counter voltage 193 and a source voltage 192, respectively. A source voltage 192 shown in FIG. 21C is applied through the source electrode to the pixel electrode while the gate of the TFT is opened by a gate voltage 191 shown in FIG. 21A. The source voltage 192 corresponds to the signal voltage $V_{on}$. A counter voltage 193 shown in FIG. 21B, which is a pulse voltage applied to the counter electrodes before the application of the source voltage 192 through the source electrode, is applied while the gates of TFTs are open. The counter voltage 193 corresponds to the first preliminary voltage $V_H$. A voltage unapplied time period, which occurs between the application of the first preliminary voltage $V_H$ (193 in FIG. 21B) and the application of the signal voltage $V_{on}$ (192 in FIG. 21C), corresponds to a period for the second preliminary voltage $V_L$.

Figure 22A:
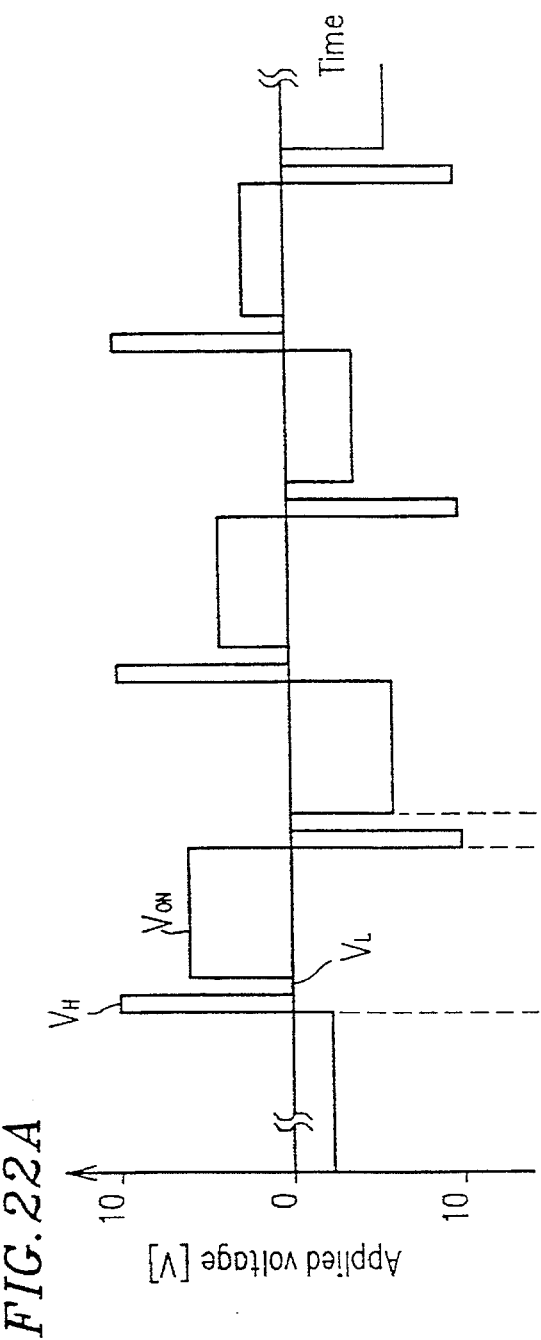
FIGS. 22A and 22B are diagrams showing a driving waveform and an optical response waveform, respectively, in the case where a liquid crystal cell fabricated according to the fabrication process of TFTs shown in FIG. 17 is driven by using a driving method of the present invention.
Figure 22B:
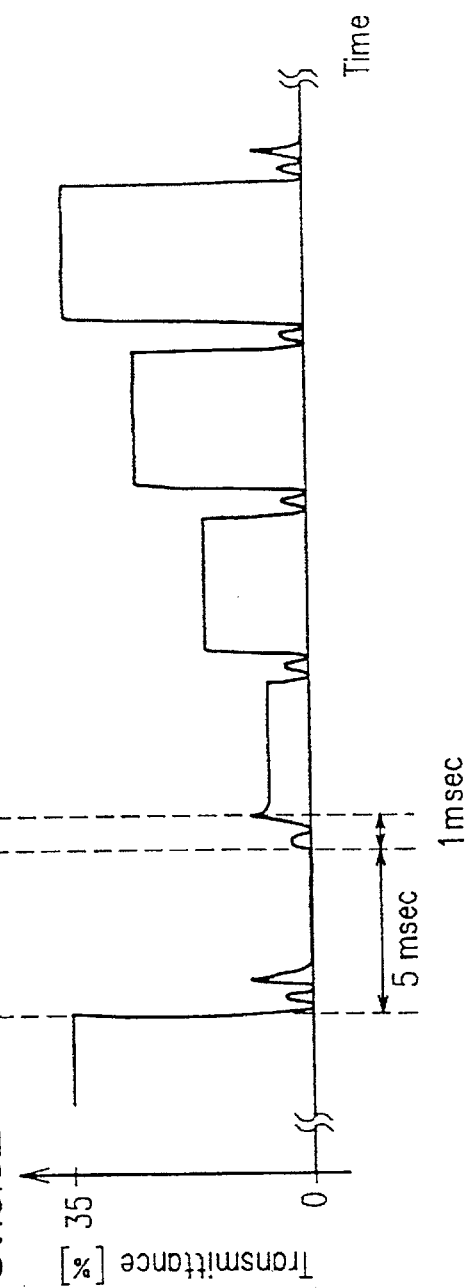

FIGS. 22A and 22B shows the case where the active matrix liquid crystal cells, which are obtained according to the fabrication process of TFTs shown in FIG. 17, are driven by using the driving method of the present invention. FIG. 22A shows a driving waveform. The driving voltage is a voltage applied to a pixel, which is a voltage difference between a source voltage (a signal voltage) and a counter voltage. FIG. 22B shows an optical response characteristic. In FIG. 22A, the signal voltage $V_{on}$ is changed to 6 V, 5 V, 4 V, 3 V, 2.4 V, under the conditions: the first preliminary voltage $V_H=10$ V; and the second preliminary voltage $V_L=0$ V. The polarity of the applied voltage is reversed in each frame in order to prevent the deterioration of the liquid crystal material. As described above, the liquid crystal display device, which is capable of responding with high speed and displaying half tone, is obtained by using the driving method of the present invention.

Figure 23:
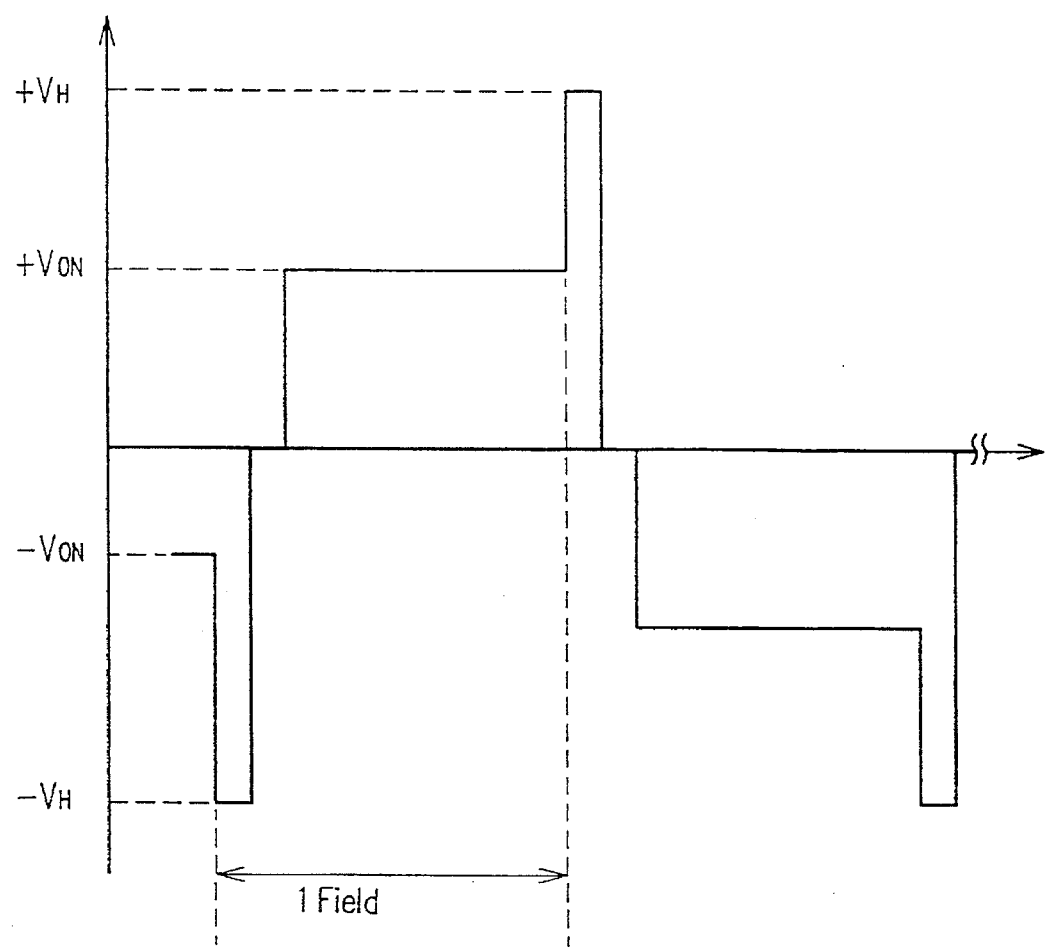
FIG. 23 is a diagram showing a driving waveform in the case where polarities of the first preliminary voltage $V_H$ and the signal voltage $V_{on}$ of FIG. 22A are reversed.

Although the display characteristic using the frame inversion driving method is shown in FIGS. 22A and 22B, the driving method is not limited to the frame inversion driving method as long as the voltage applied to the liquid crystal material does not include a direct current component as the whole driving voltage. Although the polarity of the first preliminary voltage $V_H$ is identical with that of the signal voltage $V_{on}$ in one field, the polarity of the first preliminary voltage $V_H$ may be inversed. That is, the polarity of the first preliminary voltage $V_H$ may be identical with that of a signal voltage applied in the preceding field, as is shown in FIG. 23.

In this example, although the TFT is used as a switching element, a Metal-Insulator-Metal (MIM) element may be used. As for the substrate on which the TFTs are formed, instead of the insulating substrate, an opaque substrate such as a silicon substrate may also be used for a reflective device. Although the display mode of the liquid crystal display device used in this example is homogeneous EBC mode, the display mode utilizing the birefringence, such as STN mode, may be used. An oblique vapor deposition method may be used as well as the rubbing method as an alignment controlling method. Furthermore, although the liquid crystal cell similar to the liquid crystal cell for driving is used as a birefringent material for compensating the retardation of the driving liquid crystal cell, a film having a phase difference or a material having the same effect may also be used.

EXAMPLE 6

As a sixth example, the case where a silicon single crystalline substrate is used for a back face substrate of a liquid crystal display device is described. In this example, a switching transistor for driving a pixel electrode is formed in the single crystalline silicon. Since the single crystalline silicon has high mobility (about 1500 $cm^2 \cdot V^{-1} \cdot s^{-1}$), TFTs far excellent than amorphous silicon thin film TFTs and polysilicon TFTs can be obtained. The performance of each transistor is shown in Table 1.

TABLE 1

|  |  | Single-crystalline Si | Poly-crystalline Si | Amorphous Si |
|---|---|---|---|---|
| Mobility | Electron | 1500 | 100 | 0.1–0.5 |
| ($cm^2 \cdot v^{-1} \cdot s^{-1}$) | Hole | 600 | 50 | — |
| I on/I off |  | $>10^9$ | $10^7$ | $10^5$ |
| Operation frequency (CMOS shift register) |  | Several GHz (1 μm rule) | 20 MHz $\left(\begin{array}{l}L = 10\ \mu m \\ W = 30\ \mu m\end{array}\right)$ | 5 MHz $\left(\begin{array}{l}L = 10\ \mu m \\ W = 30\ \mu m\end{array}\right)$ |

It is understood from Table 1 that the switching element having a high current driving ability and a large on/off ratio of a current can be obtained if transistors are formed in the single crystalline silicon.

As described above, the switching element with high operation speed can be obtained by forming switching transistors in a single crystalline silicon layer. Therefore, by combining the nematic liquid crystal driving method according to the present invention, which can provide a high response speed and is capable of displaying gray-scale, with the TFTs formed in the single crystalline silicon, a color display driven by the field sequential color mixing method can be realized easily.

Hereinafter, a solution for a problem in stability of the holding of signal voltages in the active matrix liquid crystal display device will be described.

Figure 24A:
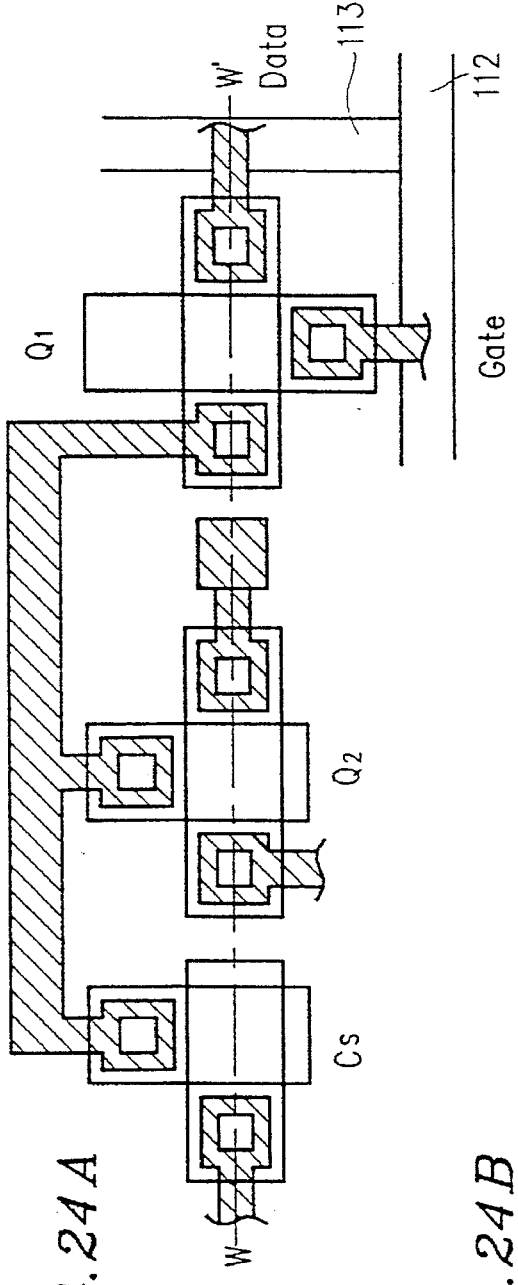
FIGS. 24A and 24B are a plane view and a cross-sectional view taken along line W–W' of FIG. 24A, respectively, in a unit pixel region of a single crystalline silicon substrate of a color liquid crystal display device according to a sixth example of the present invention.
Figure 24B:
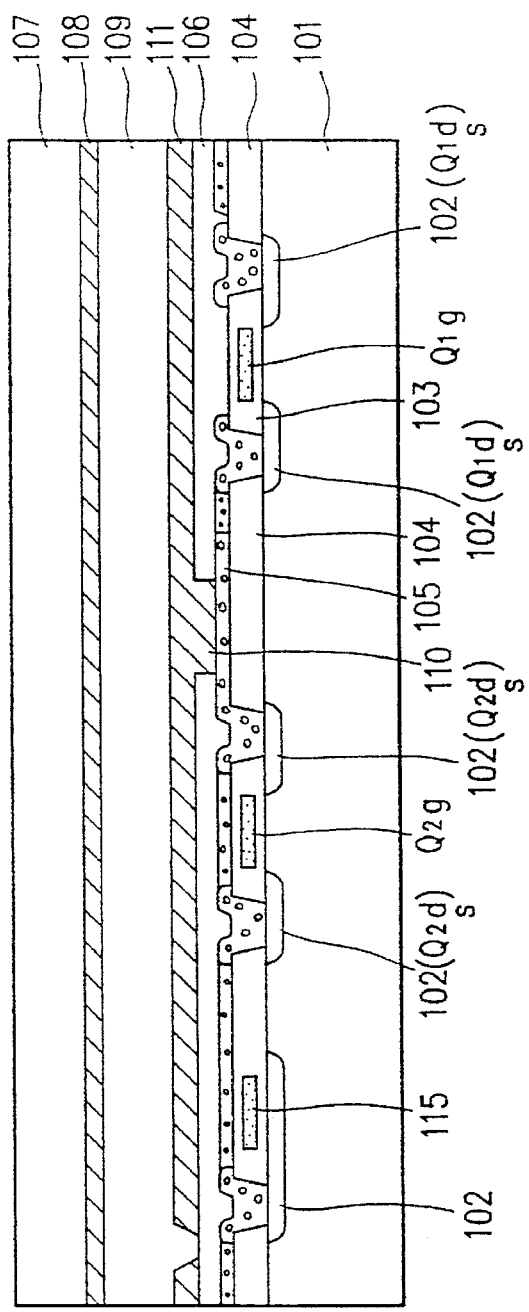

In FIGS. 24A and 24B, a configuration of a circuit of a unit pixel region of a color liquid crystal display device is shown. FIG. 24A is a plane view, and FIG. 24B is a cross-sectional view taken along a line W–W' in FIG. 24A. As shown in FIGS. 24A and 24B, a switching circuit of NMOS is formed on a base substrate 101 which is made of P-type single crystalline silicon. In this device, two transistors, that is, a first transistor Q1 and a second transistor Q2, are formed in a unit pixel region. Sources Q1s and Q2s and drains Q1d and Q2d of the respective transistors Q1 and Q2 are formed as an N-type diffusion layer 102 in the P-type single crystalline silicon. Gate electrodes Q1g and Q2g of the respective transistors Q1 and Q2 are completely covered with a gate insulating layer 103. In this example, polysilicon is used for the gate electrodes Q1g and Q2g, and a silicon oxide film is used for the gate insulating film 103. The transistors Q1 and Q2 are separated from each other by a field silicon oxide film 104 and an aluminum electrode 105 on the base substrate 101. A storage capacitor Cs is also provided in the unit pixel region. The storage capacitor Cs is constituted by the aluminum electrode 115 formed in the field silicon oxide film 104 adjacent to the second transistor Q2, the N-type diffusion layer 102 formed in the silicon layer corresponding to the position of the aluminum electrode 115, and the field silicon oxide film 104 interposed therebetween.

A protection layer 106 is formed over the surface of the base substrate 101 so as to cover the gate oxide film (including the gate electrode) 103, the field silicon oxide film 104, the aluminum electrode 105 and an aluminum wiring. The protection layer 106 is provided for protecting the NMOS circuit formed on the base substrate 101.

A through hole 110 is formed through the protection layer 106 at the position where the aluminum electrode 105 between the transistor Q2 and the field silicon oxide film 104 formed adjacent thereto is formed on the field silicon oxide film 104.

A pixel electrode 111 is formed in each unit pixel electrode region so as to cover the predetermined region on the protection film 106. The pixel electrode 111 is connected to the aluminum electrode 105 of the lower layer through the through hole 110 and is electronically connected to the drain electrode Q2d of the transistor Q2 through the aluminum electrode 105.

The gate electrode Q1g of the first transistor Q1 is connected to a scanning line 112, and the source electrode Q1s of the first transistor Q1 is connected to a signal line 113 crossing the scanning line 112. The drain electrode Q1d of the first transistor Q1, the second gate electrode Q2g of the second transistor Q2, and the aluminum electrode 115 of the storage capacitor Cs are connected to the common aluminum electrode formed on the field silicon oxide film 104.

A transparent counter electrode 108 is formed on the entire counter side face of a glass substrate 107 which is placed so as to be opposed to the base substrate 101. An alignment film (not shown) is formed so as to cover the counter electrode 108.

The glass substrate 107 and the base substrate 101 are placed so as to be opposed to each other, and a liquid crystal layer 109 is sealed therebetween. The glass substrate 107 is used as a side on which light is incident. In this example, the liquid crystal BL035 (manufactured by Merck & Co., Inc.: Δn=0.267) is injected between the two substrates 101 and 107 to form the liquid crystal layer 109 by a vacuum injection method. Although not shown in FIGS. 24A and 24B, rubbing treatment is performed on the liquid crystal alignment films so that the liquid crystal molecules are homogeneously oriented. The phase plate and the polarizer, which are optimized by the retardation of the liquid crystal layer, are placed in this order.

Although the display mode of the liquid crystal used in this example is homogeneous EBC mode, the display mode utilizing the birefringence such as STN may also be used. An oblique vapor deposition method may be used as well as the rubbing method as an alignment controlling method. Furthermore, although the liquid crystal cell similar to the driving liquid crystal cell is used as a birefringent material for compensating the retardation of the driving liquid crystal cell, a film having a phase difference or a material having the same effect may also be used.

Next, a driving circuit of the liquid crystal display device according to the sixth example and a method for driving the same will be described.

Figure 25:
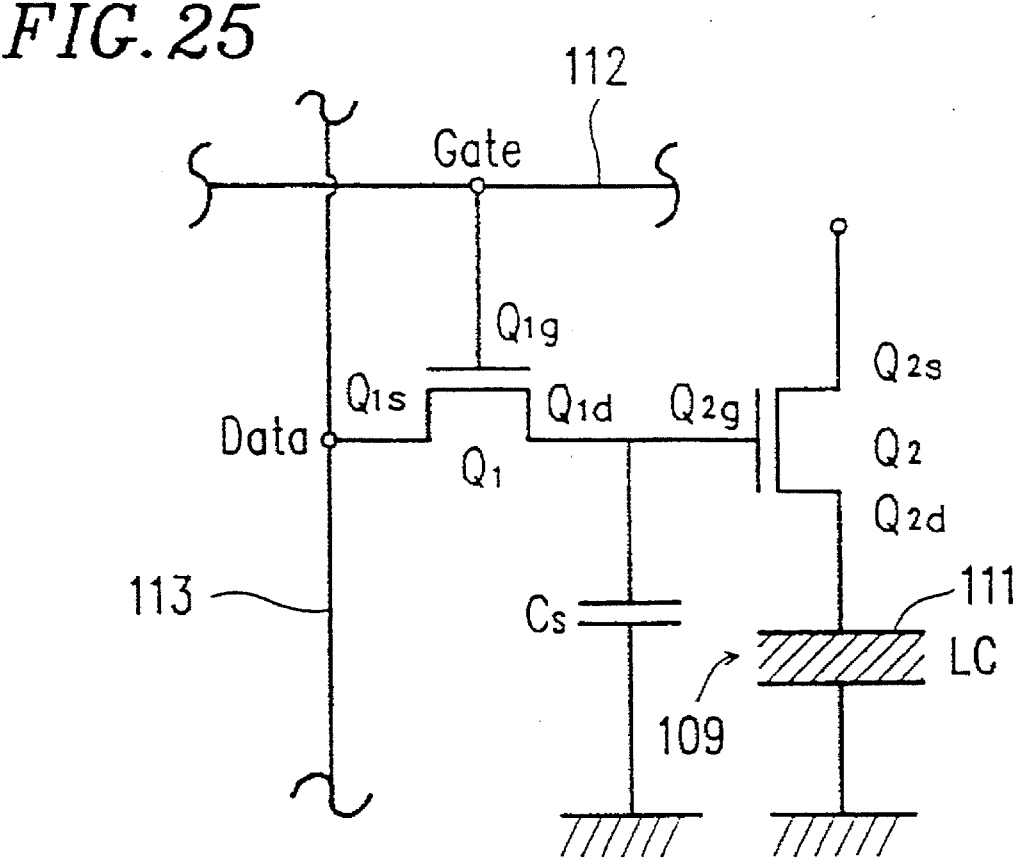
FIG. 25 is an equivalent circuit diagram showing a configuration of a circuit in the unit pixel region of FIG. 24.

In FIG. 25, an equivalent circuit of the switching circuit for driving the liquid crystal cell shown in FIGS. 24A and 24B according to the sixth example is shown. FIG. 25 shows a configuration of the circuit of the unit pixel region. As shown in FIG. 25, the first transistor Q1 is connected to the scanning line 112 and the signal line 113, respectively, in the vicinity of the intersecting point of the scanning line 112 and the signal line 113. An end of the storage capacitor Cs and the gate Q2g of the second transistor Q2 are connected to the drain Q1d of the first transistor Q1. On the other hand, the source Q2s of the second transistor Q2 is connected to the source, and the drain Q2d of the second transistor Q2 is connected to the pixel electrode 111. The second transistor Q2 has such performance that the electric potentials of the gate Q2g and the drain Q2d show a substantially linear relation. Since the first transistor Q1 supplies the data signal to the second transistor Q2, it is desirable that the amount of leak current during an off state is small. The storage capacitance Cs functions so as to hold the data signal of the first transistor Q1. The second transistor Q2 is for applying a voltage to the liquid crystal layer 109. Since the voltage is directly applied to the liquid crystal layer 109 through the second transistor Q2, the second transistor Q2 has a withstand voltage higher than a voltage required for switching the liquid crystal layer 109.

With the above configuration, when the data signal is first input to the signal line 113 and the first transistor Q1 in the pixel electrode region on the scanning line 112 is switched on by applying the scanning signal to the first scanning line 112, the data signal is successively applied to each transistor Q1 connected to the first scanning line 112. At the same time, the data signal is held in the corresponding storage capacitor Cs. Since the second transistor Q2 has a characteristic capable of controlling a source voltage in a linear relation with respect to a scanning signal voltage, a voltage proportional to the data signal voltage applied to Q2g, which corresponds to a scanning signal voltage to Q2g, is applied to the liquid crystal layer 109. The voltage applied to the liquid crystal layer 109 is controlled by the voltage held in the storage capacitor Cs. Since the voltage held in the storage capacitor Cs is maintained to the next field, a constant voltage is continuously applied to the liquid crystal layer 109 during one field. Even when the first transistor Q1 is switched off, the on state of the second transistor Q2 is maintained until the first transistor Q1 is switched on a next time. The second transistor Q2 continuously applies a voltage proportional to the data signal voltage from the storage capacitor Cs to the liquid crystal layer 109.

According to this example, it is possible to rapidly scan all of the first transistors Q1 connected to a plurality of scanning lines so as to form an entire display image. Therefore, it is possible to rewrite the entire display image at substantially the same time.

As described above, the liquid crystal display device capable of being driven by the field sequential addressing method is obtained by employing the liquid crystal display device using the silicon substrate as the back face substrate according to this example. Since the incident light passes through the liquid crystal layer twice before being output through the polarizing element, the liquid crystal layer is required to adjust the liquid crystal cell gap (d) and the refractive index anisotropy ($\Delta n$) so as to satisfy the condition: $\Delta n \cdot d > \lambda/4$ (preferably, $\Delta n \cdot d > 3\lambda/4$, which is the condition for a high-response speed).

It is possible to constitute a projection-type liquid crystal display device capable of being driven by the field sequential addressing method by using the liquid crystal device described above in the optical system shown in FIGS. 26A and 26B. Hereinafter, a display method of the projection-type liquid crystal display device will be described.

Figure 26A:
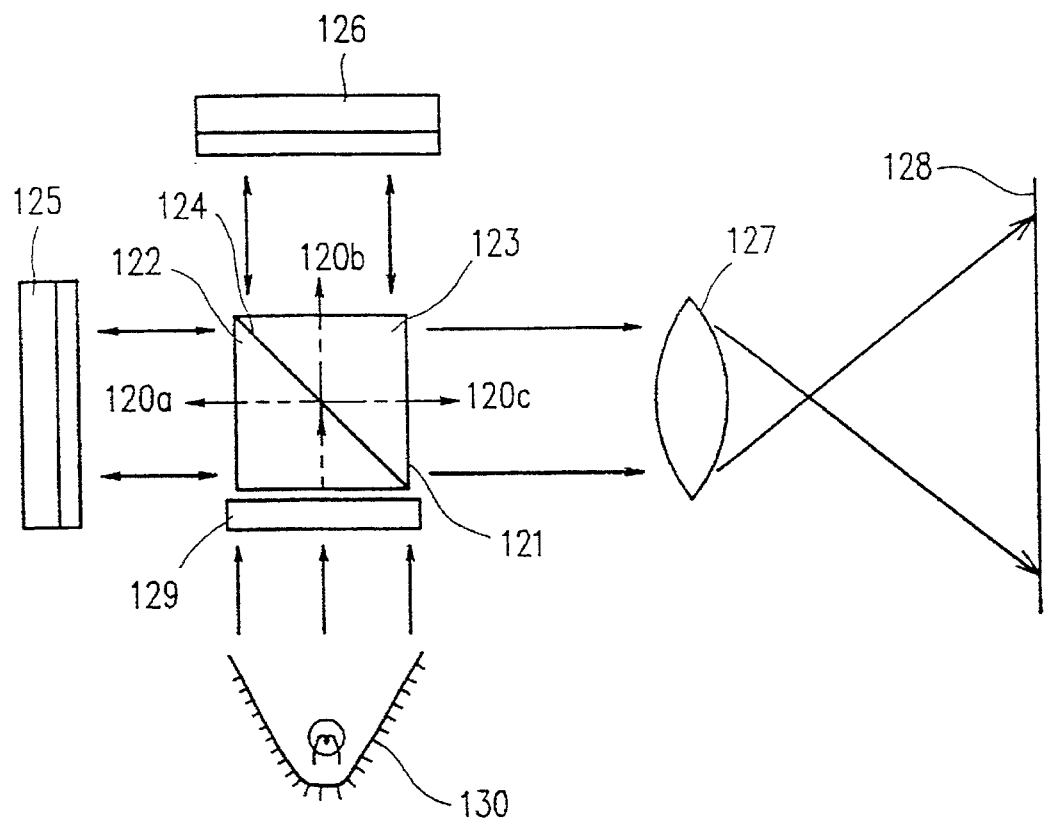
FIG. 26A is a diagram showing a configuration of a projection-type liquid crystal display device including a liquid crystal element using the single crystalline silicon substrate having the circuit configuration of FIGS. 24A and 24B and FIG. 26B is a diagram showing an example of a light selecting element used for the projection-type liquid crystal display device of FIG. 26A.
Figure 26B:
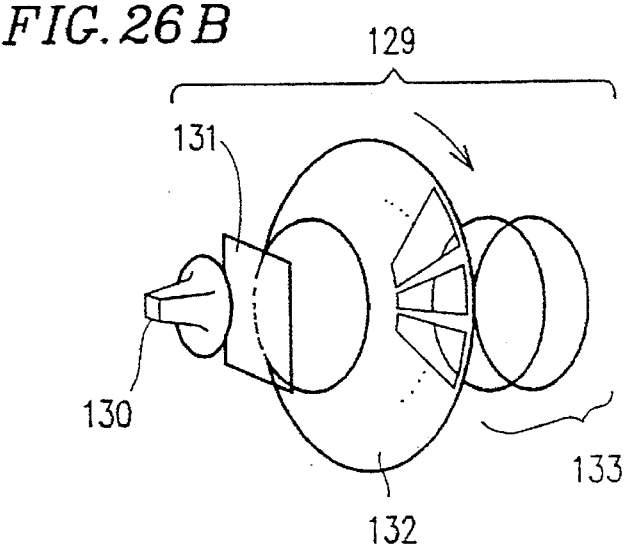

As shown in FIGS. 26A and 26B, a beam splitter prism 121, which is formed by combining the slant faces of a pair of prisms 122 and 123, splits unpolarized light beam into an S-polarized light beam 120a and a P-polarized light beam 120b at a counter slant face 124. The S-polarized light beam 120a and the P-polarized light beam 120b are output to a reflection-type liquid crystal display element 125 and a reflection-type liquid crystal display element 126, respectively. Furthermore, the beam splitter prism 121 transmits the polarized light beam 120a reflected by the reflection-type liquid crystal display element 125 and reflects the polarized light beam 120b reflected by the reflection-type liquid crystal display element 126. Accordingly, the polarized light beams 120a and 120b are combined to output a light beam 120c. The output light beam 120c is projected onto a display screen 128 through a projection lens 127.

In the optical system of FIG. 26A, a light selecting element 129, a UV-cut filter 131 and a rotor 132 equipped with red, green and blue color filters are placed in front of a light source 130 of FIG. 26B. The reference numeral 133 denotes a lens.

Figure 27:
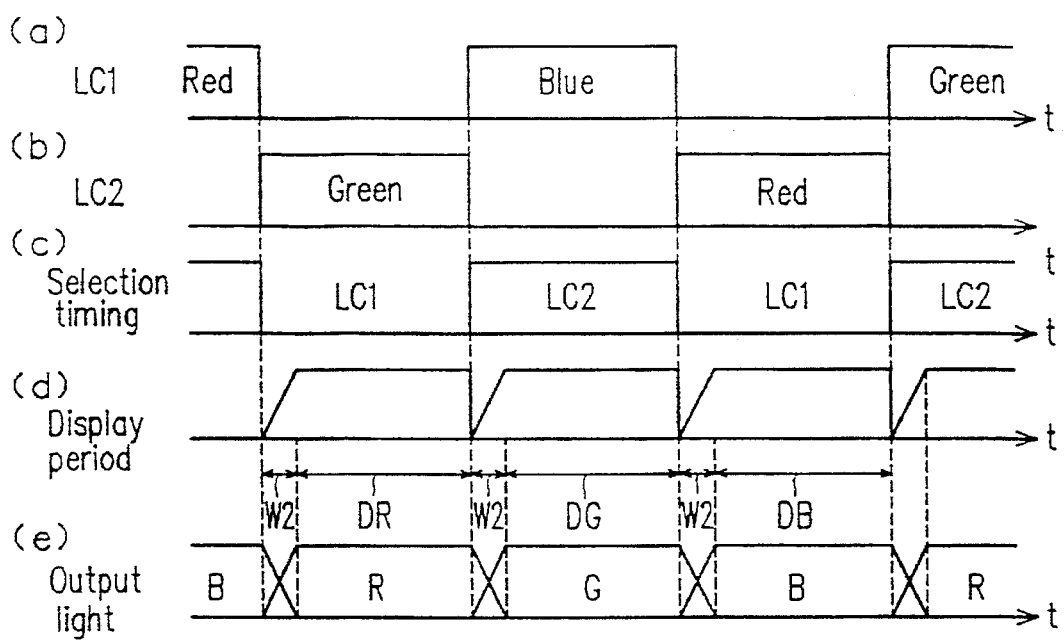
FIGS. 27(a) to 27(e) are timing charts for driving the liquid crystal display device.

FIGS. 27(a) and 27(b) shows the timings for writing data in two liquid crystal elements LC1 and LC2 (corresponding to the liquid crystal elements 125 and 126 of FIG. 26A), respectively. Red, Green and Blue of the figures represent the time periods in which the data signals corresponding to the respective colors are written, and each of the time periods corresponds to one field period. Three field periods correspond to one frame period. Each of the data signals is alternately written in LC1 and LC2. The ray output from the two liquid crystal elements LC1 and LC2 is selected with the timing shown in FIG. 27(c). The output light intensity of the liquid crystal elements LC1 and LC2 changes in terms of time as schematically shown in FIG. 27(d). Therefore, the output light intensities corresponding to R, G and B, respectively, reach the saturation intensity during the time period of W2 and then keep the saturation intensity during the time periods of DR, DG and DB, respectively. Thus, the intensity of an output light 120c in FIG. 26A changes as shown in FIG. 27(e). The color of the output light is obtained by adjusting the timing of rotation of the color filter of the rotor 132 so as to correspond to the data signal written in either LC1 or LC2 in the previous field period. In such a manner, it is possible to drive the projection-type liquid crystal display device shown in FIG. 26(a) by the field sequential addressing method.

An optical element for beam-splitting is not limited to the beam splitter prism 121. It is also possible to use the combination of a plurality of dichroic mirrors, which is capable of splitting an unpolarized light beam into an S-polarized light and a P-polarized light beam and outputting the reflected polarized light beams including the image information, which are reflected by the two reflective liquid crystal display elements 125 and 126, while being aligned. As a light source, it is possible to prepare a plurality of monochromatic light sources for a red beam, a green beam and a blue beam and select the light sources so as to be synchronized with the driving timings of the liquid crystal display device.

EXAMPLE 7

Figure 28:
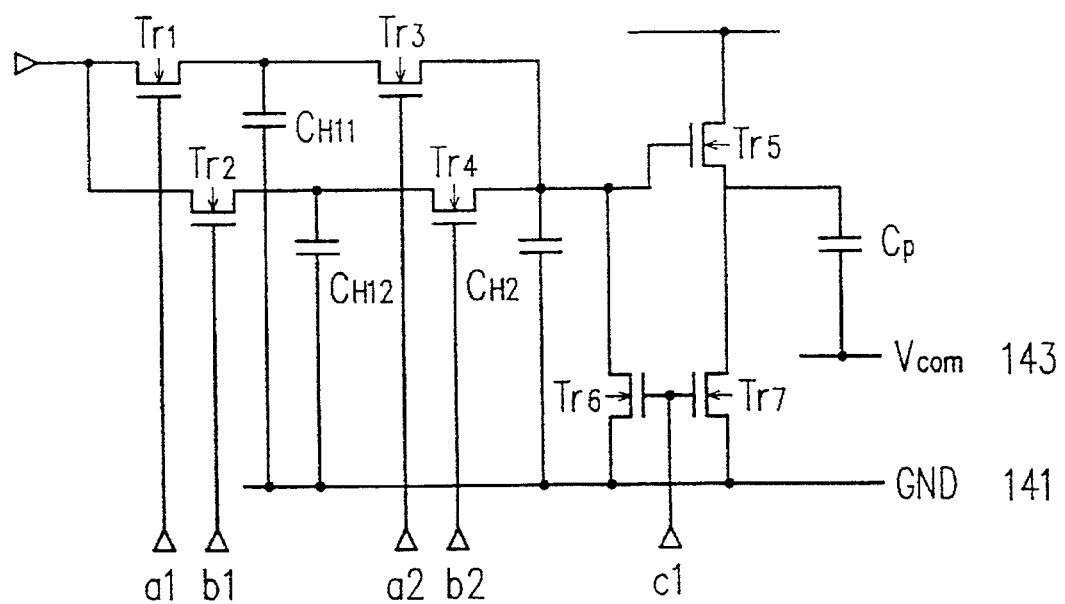
FIG. 28 is an equivalent circuit diagram showing an example of a structure of a circuit in the unit pixel region in the sixth example of the present invention.
Figure 29:
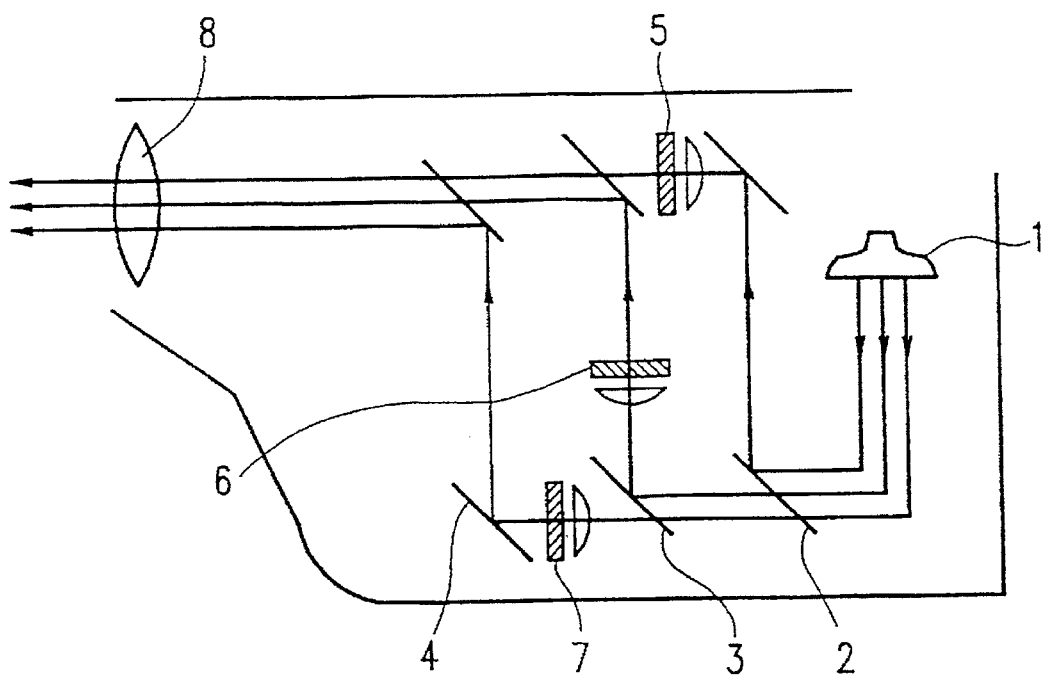
FIG. 29 is a diagram showing a configuration of an optical system of a conventional three-plate projection-type liquid crystal display device.
Figure 30:
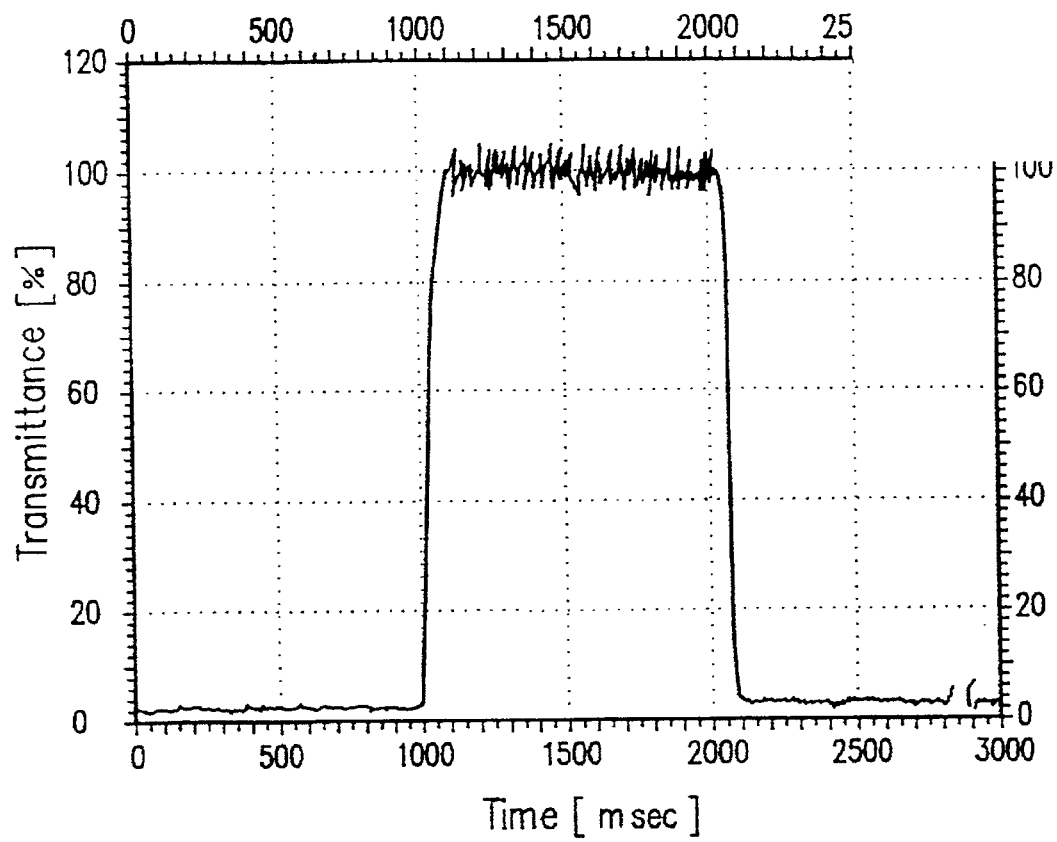
FIG. 30 is a diagram showing a light transmittance response characteristic of TN mode in a conventional liquid crystal display device.
Figure 31:
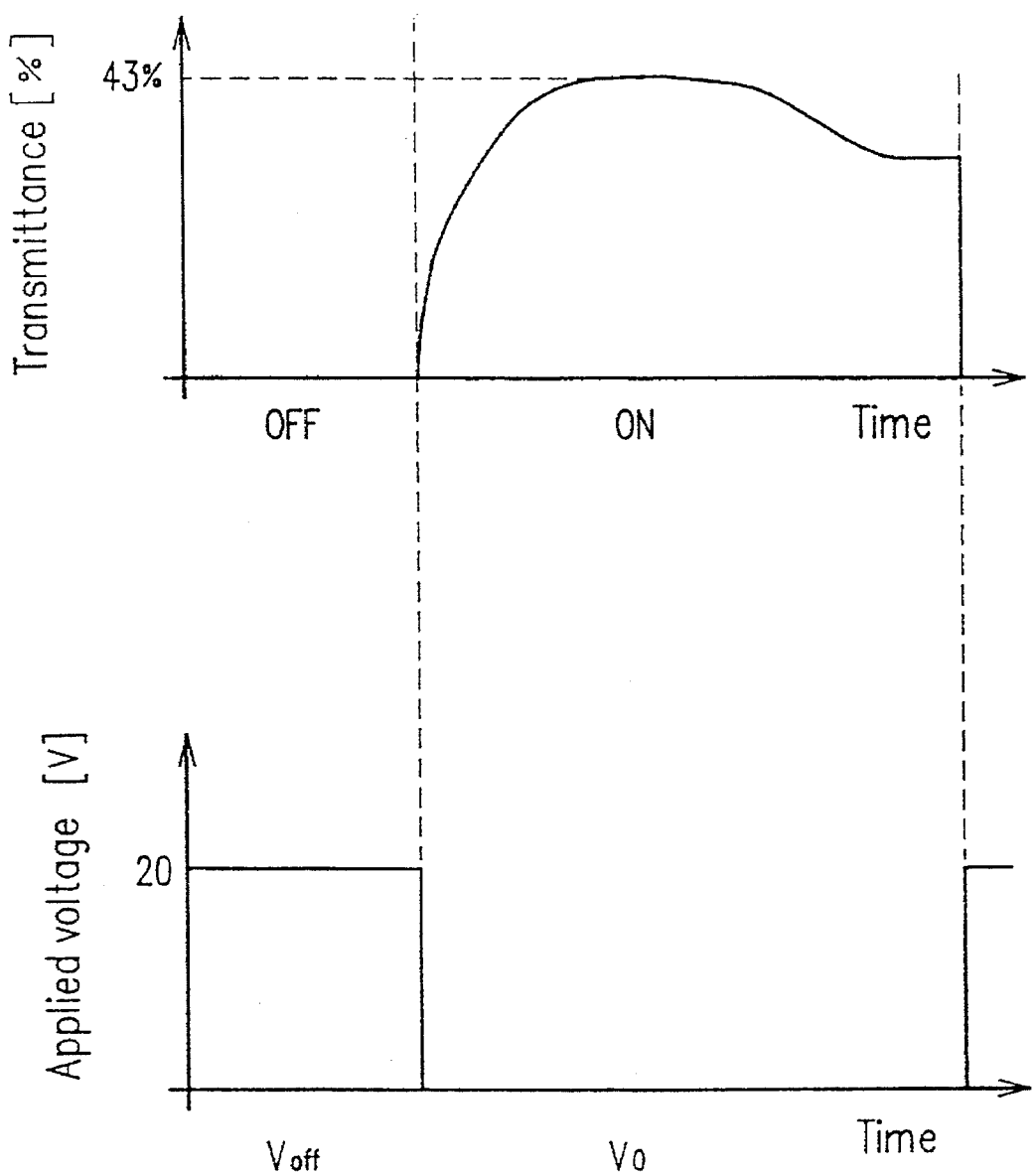
FIG. 31 is a graph showing the relation between a driving applied voltage and a light transmittance in a conventional liquid crystal display device.

As a seventh example, another example of an equivalent circuit having the configuration in the unit pixel region in the sixth example is shown in FIG. 28. As shown in FIG. 28, the data signal is supplied to either a first holding capacitor $C_{H11}$ or a first holding capacitor $C_{H12}$ through transistors Tr1 and Tr2. One electrode of the first holding capacitor $C_{H11}$ and one electrode of the first holding capacitor $C_{H12}$ are connected to one electrode of a second holding capacitor $C_{H2}$, which is common to the both first capacitors, through a transistor Tr3 and a transistor Tr4, respectively. In this manner, when the first holding capacitor $C_{H11}$ and the first holding capacitor $C_{H12}$ are directly connected to the second holding capacitor $C_{H2}$ through the transistor Tr3 or Tr4 alone, the charge of the first holding capacitor $C_{H11}$ and the first holding capacitor $C_{H12}$ are distributed to the second holding capacitor $C_{H2}$. Therefore, in order to avoid the effect due to reduction of the voltage, it is necessary to adjust the timing so that the transistors Tr1 to Tr4 are not switched on at the same time as well as keep the capacitance of the second holding capacitor $C_{H2}$ at a sufficiently small value as compared with those of the first holding capacitor $C_{H11}$ and the first holding capacitor $C_{H12}$.

One electrode of the second holding capacitor $C_{H2}$ and one electrode of a pixel capacitor Cp are connected to a ground line 141 through transistors Tr6 and Tr7, respectively. In the configuration of the circuit shown in FIG. 28, the other electrodes of the first holding capacitor $C_{H11}$, the first holding capacitor $C_{H12}$ and the second holding capacitor $C_{H12}$ are connected to the ground line 141, thereby keeping their reference voltages at GND level.

One electrode of the second holding capacitor $C_{H2}$ is connected to a gate terminal of the transistor Tr5, and a source terminal of the transistor Tr5 is connected to one electrode of the pixel capacitor Cp. A drain terminal of the transistor Tr5 is connected to a high-voltage line 142 and the other common electrode of the pixel capacitor Cp is connected to a common line 143, thereby constituting a buffer amplifier circuit with a voltage follower circuit.

With the above configuration, regarding the pixel, when a first negative scanning signal a1 becomes active, the transistor Tr1 is switched on and the data signal is supplied to the first holding capacitor $C_{H11}$. Next, a second negative scanning signal a2 becomes active, the transistor Tr3 is switched on and the charge is distributed to the second holding capacitor $C_{H2}$. When a first positive scanning signal b1 becomes active, the transistor Tr2 is switched on and the data signal is supplied to the first holding capacitor $C_{H12}$. Next, when a second positive scanning signal b2 becomes active, the transistor Tr4 is turned on and the charge is distributed to the second holding capacitor $C_{H2}$. Before the second positive scanning signal b2 becomes active, a refresh signal c1 becomes active so as to switch the transistors Tr6 and Tr7 on and discharge the second holding capacitor $C_{H2}$ and the pixel capacitor Cp. Then, the transistor Tr5 supplies the current to the pixel capacitor Cp from the high voltage line 142 to charge the pixel capacitor Cp in accordance with the voltage of the second holding capacitor $C_{H2}$, to which the charge is distributed. The pixel capacitor Cp is charged until the voltage of the pixel capacitor Cp becomes lower than that of the second holding capacitor $C_{H2}$ by the threshold voltage of the transistor Tr5. Thereafter, it is possible to maintain the voltage of the pixel capacitor Cp by compensating the charge due to the leak current. In the configuration of the circuit, when the transistors Tr3 and Tr4 are activated, the charge in the first capacitors for holding is discharged to the second holding capacitor. At the same time, the voltage is applied to the transistor Tr5 in accordance with the signal (charge), thereby supplying the voltage to the liquid crystal layer. The field sequential color mixing method can be more easily realized by using the silicon substrate as a back face substrate of the light crystal display element of the projection-type liquid crystal display device shown in the sixth example.

The liquid crystal display driving waveform described in the second and the third examples are applied to the liquid crystal after the application of the refresh signal c1. At this moment, it is desirable to apply the first preliminary voltage $V_H$ and the second preliminary voltage $V_L$ to all the pixel capacitors constituting the entire image at the same time. It is desirable that the time period from the application of the second preliminary voltage $V_L$ to the application of the signal voltage $V_{on}$ of the display signal is short. In this example, it is possible to make the time period approximately zero, and therefore to eliminate the unevenness of the display image.

Although the configuration of the circuit as shown in FIG. 28 is used in this example, the configuration is not limited as long as the similar effect can be obtained.

As described above, according to the present invention, the liquid crystal display device is driven by applying the voltage to the pixels in the field sequential addressing method so that optical on/off is carried out between the voltages corresponding to the maximum light transmittance and the minimum light transmittance in the V-T characteristic in the case: $d \times \Delta n > \lambda/2$, where the thickness of the liquid crystal layer is d, the birefringence for the liquid crystal layer is $\Delta n$, and the wavelength of light for display is $\lambda$. As a result, although the orientational deformation of the liquid crystal molecules is small, the liquid crystal display having a sufficient response speed and a sufficient contrast ratio can be obtained.

If the driving voltage waveform applying the first preliminary voltage having an absolute value larger than at least that of the signal voltage before applying the signal voltage for obtaining the predetermined transmittance or reflectance to the pixels, the sufficient optical response of the liquid crystal display is obtained. If the time period for applying the second preliminary voltage is provided between the time periods for applying the first preliminary voltage and the signal voltage, the deformation in the waveform of the optical response characteristic is eliminated, thereby increasing the optical response speed.

If a retardation compensation means for compensating the retardation which is the optical path difference in both substrates and the liquid crystal layer between the ordinary components and the extraordinary components is provided, the same optical response characteristic is obtained even with a lower driving voltage.

Furthermore, if the silicon single crystalline substrate is used for a substrate of the liquid crystal device and the transistor for driving pixels are formed in the single crystalline silicon, far excellent TFTs, as compared with amorphous silicon thin film TFTs or polysilicon TFTs can be obtained since the single crystalline silicon has a large mobility.

The light modulating elements which respond with high speed and the spatial light modulating elements such as projection-type liquid crystal display device and arithmetic device capable of being driven by the field sequential addressing method can be obtained by driving the liquid crystal device in accordance with the above procedure. If, for example, a CCD and the high-speed light modulating element are combined, a compact CCD element with high precision can be obtained since signals of red, green and blue can be detected by one pixel of the CCD.

As described above, since the liquid crystal display mode having high-speed response and capable of display half tone is realized, the liquid crystal devices such as a color liquid crystal display device capable of being driven by the field sequential addressing method can be obtained. In addition, the liquid crystal device according to the invention is suitable for an image input device using the liquid crystal device as a spatial light modulation element, which is used for an optical computing system.

Various other modifications will be apparent to and can be readily made by those skilled in the art without departing from the scope and spirit of this invention. Accordingly, it is not intended that the scope of the claims appended hereto be limited to the description as set forth herein, but rather that the claims be broadly construed.

What is claimed is:

1. A liquid crystal device comprising:

a pair of substrates;

a liquid crystal layer interposed between the pair of substrates;

at least one polarizing element;

a plurality of pixels;

a retardation ($d \times \Delta n$) of the liquid crystal layer satisfying one of a relation:

$$d \times \Delta n > \lambda/2$$

in a case where an incident light is output after passing through the liquid crystal layer once, and a relation:

$$2d \times \Delta n > \lambda/2$$

in a case where the incident light is output after passing through the liquid crystal layer twice, where d is a thickness of the liquid crystal layer, $\Delta n$ is a birefringence, and $\lambda$ is a wavelength of the light incident on the liquid crystal layer; and driving voltage applying means for applying a driving voltage including a voltage higher than a maximum voltage providing an extremum of the output light intensity in a voltage-output light intensity characteristic of the pixels to the plurality of pixels thereby utilizing a relaxation process of liquid crystal molecules in the liquid crystal layer to obtain a predetermined output light intensity.

2. A liquid crystal device according to claim 1, wherein the driving voltage applying means applies the driving voltage to the pixels by a field sequential addressing method.

3. A liquid crystal device according to claim 2, includes retardation compensation means between the liquid crystal layer and the polarizing element.

4. A liquid crystal device according to claim 3, wherein the retardation compensation means has at least a pair of substrates and a second liquid crystal layer interposed therebetween, and an electro-optical characteristic of the second liquid crystal layer is substantially identical with that of the liquid crystal layer.

5. A liquid crystal device according to claim 3, wherein the retardation compensation means is selected from a phase plate and a phase film.

6. A liquid crystal device according to claim 5, wherein the retardation compensation means is selected from a uniaxially oriented polymer film and a biaxially oriented film.

7. A liquid crystal device according to claim 1, wherein the driving voltage applying means applies a voltage higher than the maximum voltage providing the extremum of the output light intensity in the voltage-output light intensity characteristic and a voltage between the voltage higher than the maximum voltage and the maximum voltage, thereby controlling the output light intensity of the pixels.

8. A liquid crystal device according to claim 1, wherein the driving voltage applying means reverses a polarity of the driving voltage in each frame.

9. A liquid crystal device according to claim 1, wherein the driving voltage applying means applies a first preliminary voltage having an absolute value larger than that of a signal voltage corresponding to a predetermined output light intensity before applying the signal voltage to the pixels.

10. A liquid crystal device according to claim 9, wherein the driving voltage applying means further applies a second preliminary voltage having an absolute value smaller than that of the signal voltage before applying the signal voltage corresponding to the predetermined output light intensity and after applying the first preliminary voltage.

11. A liquid crystal device according to claim 10, wherein the absolute value of the second preliminary voltage is smaller than that of the maximum voltage providing the extremum in the voltage-output light intensity characteristic of the pixels.

12. A liquid crystal device according to claim 10, wherein a sum of the time period for applying the first preliminary voltage and the time period for applying the second preliminary voltage is one-fifth or less than a time period for applying the signal voltage.

13. A liquid crystal device according to claim 10, wherein the driving voltage applying means applies the first preliminary voltage and the second preliminary voltage to the pixels connected to at least one scanning line for display.

14. A liquid crystal device according to claim 10, wherein at least one of the first preliminary voltage and the second preliminary voltage has an identical value for all the pixels.

15. A liquid crystal device according to claim 9, wherein the output light intensity at a maximum value of the signal voltage is equal to or less than 10% of a maximum in the voltage-output light intensity characteristic of the pixels.

16. A liquid crystal device according to claim 9, wherein a time period for applying the first preliminary voltage is one-fifth or less than that for applying the signal voltage.

17. A liquid crystal device according to claim 9, wherein the driving voltage applying means applies the first preliminary voltage to the pixels connected to at least one scanning line.

18. A liquid crystal device according to claim 9, wherein the driving voltage applying means applied the first preliminary voltage to the pixels connected to each of a plurality of scanning lines at the same time.

19. A liquid crystal device according to claim 9, wherein a value of the first preliminary voltage is identical for all the pixels.

20. A liquid crystal device according to claim 1, wherein one of the pair of substrates is a silicon single crystalline substrate, and the silicon single crystalline substrate has a transistor switching a voltage applied from the driving voltage applying means to each of the plurality of pixels.

21. A projection-type liquid crystal display device including a liquid crystal element, wherein the liquid crystal element comprises:

a pair of substrates;

a liquid crystal layer interposed between the pair of substrates;

at least one polarizing element;

a plurality of pixels;

a retardation ($d \times \Delta n$) of the liquid crystal layer satisfying one of a relation:

$$d \times \Delta n > \lambda/2$$

in case where an incident light is output after passing through the liquid crystal layer once, and a relation:

$$2d \times \Delta n > \lambda/2$$

in a case where the incident light is output after passing through the liquid crystal layer twice, where d is a thickness of the liquid crystal layer Δn is a birefringence, and λ is a wavelength of the light incident on the liquid crystal layer; and driving voltage applying means for applying a driving voltage including a voltage higher than a maximum voltage providing an extremum of the output light intensity in a voltage-output light intensity characteristic of the pixels to the plurality of pixels thereby utilizing a relaxation process of liquid crystal molecules in the liquid crystal layer to obtain a predetermined output light intensity.

22. A method for improving a contrast ratio of a liquid crystal device including:

a pair of substrates;

a liquid crystal layer interposed between the pair of substrates;

at least one polarizing element; and a plurality of pixels said method comprising the steps of:

providing a retardation (d×Δn) of the liquid crystal layer satisfying one of a relation:

$$d \times \Delta n > \lambda/2$$

in a case where an incident light is output after passing through the liquid crystal layer once, and a relation:

$$2d \times \Delta n > \lambda/2$$

in a case where the incident light is outputted after passing through the liquid crystal layer twice, where d is a thickness of the liquid crystal layer, Δn is a birefringence, and λ is a wavelength of the light incident on the liquid crystal layer; and utilizing a relaxation process of liquid crystal molecules in the liquid crystal layer to obtain a predetermined output light intensity applying a driving voltage including a voltage higher than a maximum voltage providing an extremum of the output light intensity in a voltage-output light intensity characteristic of the pixels to the plurality of pixels.

23. A method according to claim 22, wherein the driving voltage applying step includes applying a first preliminary voltage having an absolute value larger than that of a signal voltage corresponding to a predetermined output light intensity before applying the signal voltage to the pixels.

24. A method according to claim 23, wherein a time period for applying the first preliminary voltage is one-fifth or less than that for applying the signal voltage.

25. A method according to claim 23, wherein the driving voltage applying step includes applying the first preliminary voltage to the pixels connected to each of a plurality of scanning lines at the same time.

26. A method according to claim 23, wherein a value of the first preliminary voltage is identical for all the pixels.

27. A method according to claim 23, wherein the driving voltage applying step includes applying the first preliminary voltage to the pixels connected to at least one scanning line.

28. A method according to claim 23, wherein the driving voltage applying step further includes applying a second preliminary voltage having an absolute value smaller than that of the signal voltage before applying the signal voltage corresponding to the predetermined output light intensity and after applying the first preliminary voltage.

29. A method according to claim 28, wherein the absolute value of the second preliminary voltage is smaller than that of the maximum voltage providing the extremum in the voltage-output light intensity characteristic of the pixels.

30. A method according to claim 28, wherein a sum of the time period for applying the first preliminary voltage and the time period for applying the second preliminary voltage is one-fifth or less than a time period for applying the signal voltage.

31. A method according to claim 28, wherein the driving voltage applying step includes applying the first preliminary voltage and the second preliminary voltage to the pixels connected to at least one scanning line for display.

32. A method according to claim 28, wherein at least one of the first preliminary voltage and the second preliminary voltage has an identical value for all the pixels.

33. A method according to claim 22, wherein the driving voltage applying step includes applying the driving voltage to the pixels by a field sequential addressing method.

34. A method according to claim 22, wherein the driving voltage applying step includes applying a voltage higher than the maximum voltage providing the extremum of the output light intensity in the voltage-output light intensity characteristic and a voltage between the voltage higher than the maximum voltage and the maximum voltage, thereby controlling the output light intensity of the pixels.

35. A method according to claim 22, wherein a polarity of the driving voltage is reversed in each frame.

36. A liquid crystal device comprising:

a pair of substrates;

a liquid crystal layer interposed between the pair of substrates;

at least one polarizing element;

a plurality of pixels;

a retardation (d×Δn) of the liquid crystal layer satisfying one of a relation:

$$d \times \Delta n > \lambda/2$$

in a case where an incident light is output after passing through the liquid crystal layer once, and a relation:

$$2d \times \Delta n > \lambda/2$$

in a case where the incident light is output after passing through the liquid crystal layer twice, were d is a thickness of the liquid crystal layer, Δn is a birefringence, and λ is a wavelength of the light incident on the liquid crystal layer; and driving voltage applying means for applying a driving voltage including a voltage higher than a maximum voltage providing an extremum of the output light intensity in a voltage-output light intensity characteristic of the pixels to the plurality of pixels thereby utilizing a relaxation process of liquid crystal molecules in the liquid crystal layer to obtain a predetermined output light intensity, wherein the driving voltage applying means applies a first preliminary voltage having an absolute value larger than that of a signal voltage corresponding to a predetermined output light intensity before applying the signal voltage to the pixels, and a second preliminary voltage having an absolute value smaller than that of the signal voltage before applying the signal voltage and after applying the first preliminary voltage.

37. A liquid crystal device according to claim 36, wherein the absolute value of the second preliminary voltage is smaller than that of the maximum voltage providing the extremum in the voltage-output light intensity characteristic of the pixels.

38. A liquid crystal device according to claim 36, wherein a sum of the time period for applying the first preliminary voltage and the time period for applying the second preliminary voltage is one-fifth or less than a time period for applying the signal voltage.

39. A liquid crystal device according to claim 36, wherein the driving voltage applying means applies the first preliminary voltage and the second preliminary voltage to the pixels connected to at least one scanning line for display.

40. A liquid crystal device according to claim 36, wherein at least one of the first preliminary voltage and the second preliminary voltage has an identical value for all the pixels.

41. A liquid crystal device according to claim 36, further including retardation compensation means between the liquid crystal layer and the polarizing element thereby reducing the driving voltage.

42. A liquid crystal device according to claim 36, wherein the driving voltage supplying means applies the driving voltage to the pixels by a field sequential addressing method.

43. A liquid crystal device according to claim 42, wherein one of the pair of substrates is a silicon single crystalline substrate, and the silicon single crystalline substrate has a transistor switching a voltage applied from the driving voltage applying means to each of the plurality of pixels.

44. A method for improving a contrast ratio of a liquid crystal device including:

a pair of substrates;

a liquid crystal layer interposed between the pair of substrates;

at least one polarizing element; and a plurality of pixels, said method comprising the steps of:

providing a retardation ($d \times \Delta n$) of the liquid crystal layer satisfying one of a relation:

$$d \times \Delta n > \lambda/2$$

in a case where an incident light is output after passing through the liquid crystal layer once, and a relation:

$$2d \times \Delta n > \lambda/2$$

in a case where an incident light is outputted after passing through the liquid crystal layer twice, where d is a thickness of the liquid crystal layer, $\Delta n$ is a birefringence and $\lambda$ is a wavelength of the light incident on the liquid crystal layer; and applying a driving voltage including a voltage higher than a maximum voltage providing an extremum of the output light intensity in a voltage-output light intensity characteristic of the pixels to the plurality of pixels, wherein the driving voltage applying step includes applying a first preliminary voltage having an absolute value larger than that of a single voltage corresponding to a predetermined output light intensity before applying the signal voltage to the pixels and a second preliminary voltage having an absolute value smaller than that of the signal voltage before applying the signal voltage corresponding to the predetermined output light intensity and after applying the first preliminary voltage.

45. A method according to claim 44, wherein the absolute value of the second preliminary voltage is smaller than that of the maximum voltage providing the extremum in the voltage-output light intensity characteristic of the pixels.

46. A method according to claim 44, wherein a sum of the time period for applying the first preliminary voltage and the time period for applying the second preliminary voltage is one-fifth or less than a time period for applying the signal voltage.

47. A method according to claim 44, wherein the driving voltage applying step includes applying the first preliminary voltage and the second preliminary voltage to the pixels connected to at least one scanning line for display.

48. A method according to claim 44, wherein at least one of the first preliminary voltage has an identical value for all the pixels.

49. A method according to claim 44, wherein the driving voltage applying step includes applying the driving voltage to the pixels by a field sequential addressing method.

50. A method according to claim 44, wherein the driving voltage applying step includes applying the first preliminary voltage to the pixels connected to each of a plurality of scanning lines at the same time.

* * * * *